United States Patent
Iwazaki et al.

(10) Patent No.: US 11,005,410 B2
(45) Date of Patent: May 11, 2021

(54) MOTOR DRIVING APPARATUS

(71) Applicant: Mitsubishi Electric Corporation, Tokyo (JP)

(72) Inventors: Kenji Iwazaki, Tokyo (JP); Koichi Arisawa, Tokyo (JP); Takashi Yamakawa, Tokyo (JP); Keisuke Uemura, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 16/332,556

(22) PCT Filed: Oct. 31, 2016

(86) PCT No.: PCT/JP2016/082247
§ 371 (c)(1),
(2) Date: Mar. 12, 2019

(87) PCT Pub. No.: WO2018/078851
PCT Pub. Date: May 3, 2018

(65) Prior Publication Data
US 2020/0021232 A1    Jan. 16, 2020

(51) Int. Cl.
F25B 30/02    (2006.01)
H02P 29/024    (2016.01)
H02P 25/18    (2006.01)
H02P 27/08    (2006.01)
F25B 13/00    (2006.01)

(52) U.S. Cl.
CPC .......... H02P 29/027 (2013.01); H02P 25/184 (2013.01); H02P 27/08 (2013.01); F25B 13/00 (2013.01)

(58) Field of Classification Search
CPC ....... H02P 29/027; H02P 27/08; H02P 25/184
USPC .......................................... 318/434; 62/324.6
See application file for complete search history.

(56) References Cited

U.S. PATENT DOCUMENTS 9,917,543 B1 * 3/2018 Sarlioglu .................. H02P 6/16
2015/0168033 A1 * 6/2015 Yamakawa ............. F25B 13/00
62/324.6

FOREIGN PATENT DOCUMENTS

JP    2008-228513 A    9/2008
JP    2014-176273 A    9/2014

* cited by examiner

*Primary Examiner* — Eduardo Colon Santana
*Assistant Examiner* — Zemenay T Truneh
(74) *Attorney, Agent, or Firm* — Posz Law Group, PLC

(57) ABSTRACT

An over-current protection circuit for a motor capable of selecting one of a plurality of connection states has a plurality of decision circuits, a combining circuit, and a nullifying circuit. The combining circuit combines results of the comparisons in the plurality of decision circuits. The nullifying circuit nullifies part of the comparisons in the plurality of decision circuits. The number of outputs of the over-current protection circuit is one, so that for controlling the driving and stopping of the inverter needs just one terminal is required for receiving the output of the combining circuit. Moreover, because the over-current protection circuit is formed of hardware, the protection can be performed at a high speed.

24 Claims, 17 Drawing Sheets

MOTOR DRIVING APPARATUS

CROSS REFERENCE TO RELATED APPLICATION

This application is a U.S. national stage application of International Patent Application No. PCT/JP2016/082247 filed on Oct. 31, 2016, the disclosure of which is incorporated herein by reference.

TECHNICAL FIELD

The present invention relates to a motor driving apparatus provided with an inverter. For example, the present invention relates to a motor driving apparatus in which an alternating current with a variable frequency and a variable voltage is supplied from an inverter to a permanent magnet synchronous motor to cause it to perform variable speed operation.

BACKGROUND ART

A motor driving apparatus is known which uses an inverter with a variable frequency and a variable voltage to change the rotational speed of a motor, and in which the connection state of the stator windings is switched based on the load, thereby to reduce the power consumption and improve the efficiency.

Examples of connection state switching include one between a star (Y) connection and a delta (Δ) connection, and one between a parallel connection and a serial connection.

For example, in the case of an electric motor for a compressor of an air conditioner, it is contemplated to drive it with a star connection in an intermediate condition (low-load condition) whose ratio of contribution to the annual power consumption is high, and drive it with a delta connection in a rated condition (high-load condition). By doing so, it is possible to improve the efficiency in the intermediate condition, and to enable high-power output in the rated condition.

In the case of a motor using permanent magnets, the magnets are demagnetized when the currents flowing through the stator windings are excessive, so that protective measures are taken to restrain the currents flowing through the stator windings to within a permissible value.

For the above protection, a control is often employed in which the inverter current is detected, and a decision is made as to whether the detected current exceeds a threshold value, and the inverter is stopped when the threshold is exceeded.

When the inverter current is detected and the detected current is compared with a threshold value, it is necessary to use different threshold values depending on the connection state because the ratio between the detected current and the winding current is different depending on the connection state.

For instance, in the case of the star connection, the inverter output current and the winding current are of the same magnitude, whereas in the case of the delta connection, the inverter output current is $\sqrt{3}$ times the winding current.

Accordingly, when an inverter is controlled so as to prevent the detected value of the inverter current from exceeding a threshold value for the purpose of preventing demagnetization, the threshold value for the star connection needs to be $1/\sqrt{3}$ times the threshold value for the delta connection.

Accordingly, it has been proposed to switch the threshold value (reference value) depending on the connection state (Patent reference 1, paragraphs 0048, 0070, FIGS. 14(c), 14(d)).

It has also been proposed to provide separate comparison circuits for the respective connection states, and a CPU which makes an abnormality decision based on the outputs of the comparison circuits (Patent Reference 1, paragraph 0042, FIG. 14(b)).

PATENT REFERENCE

Patent Reference 1: Japanese Patent Publication No. 2008-228513 (Paragraphs 0042, 0048, 0070, FIGS. 14(b) to 14(d))

In the configuration of FIG. 14(c) or 14(d) of Patent reference 1, a resistor in a single over-current protection circuit is short-circuited by a transistor, to alter the threshold value. A problem with this configuration is that, when a low-cost digital transistor is used as the transistor, the accuracy of the protection level is lowered because of relatively large manufacturing variations of the digital transistors. If the threshold value is set to a lower value (to provide a margin), taking account of the variations, the motor cannot be made to operate to the limit of its capacity. Transistors and resistors with smaller variations are expensive, and if such transistors and resistors are used, the over-current protection circuit becomes expensive.

In the configuration of FIG. 14(b) of Patent reference 1, outputs of two comparison circuits are input to a CPU, which performs processing on the two inputs. Problems are that it is necessary to use two input ports of a CPU, the time required for processing in the CPU is long, and the processing load on the CPU is heavy.

SUMMARY

The present invention has been made to solve the problems described above, and its object is to provide a motor driving apparatus by which the over-current protection can be performed with a protection level appropriate for each connection state, the over-current protection circuit has a single output, and the over-current protection can be performed at a high speed.

A motor driving apparatus according to the present invention comprises:

a connection switching means for selecting one of a plurality of connection states of a motor which is capable of operation in one of the plurality of connection states;

an inverter for supplying said motor with AC power, to cause said motor to operate;

a control device for causing said connection switching means to make selection of the connection state, and controlling said inverter; and an over-current protection circuit for protecting said inverter; wherein said over-current protection circuit comprises:

a plurality of decision circuits respectively provided for said plurality of connection states;

a combining circuit for combining results of comparisons in said plurality decision circuits; and a nullifying circuit for nullifying part of the comparisons in said plurality of decision circuits.

According to the present invention, part of the comparisons in the plurality of decision circuits is nullified, so that the over-current protection can be performed with a protection level appropriate for the particular connection state.

Also, because the outputs of a plurality of decision circuits are combined, the over-current protection circuit has a single output, and the device for controlling the driving and stopping of the inverter needs to have only a single terminal for receiving the output of the over-current protection circuit.

Moreover, the over-current protection circuit is configured of hardware, so that a high-speed protection is possible.

DETAILED DESCRIPTION

Embodiments of the present invention will now be described.

In the embodiments described below, the present invention is applied to a driving apparatus for a motor for driving a compressor of an air conditioner.

First Embodiment

Figure 1:
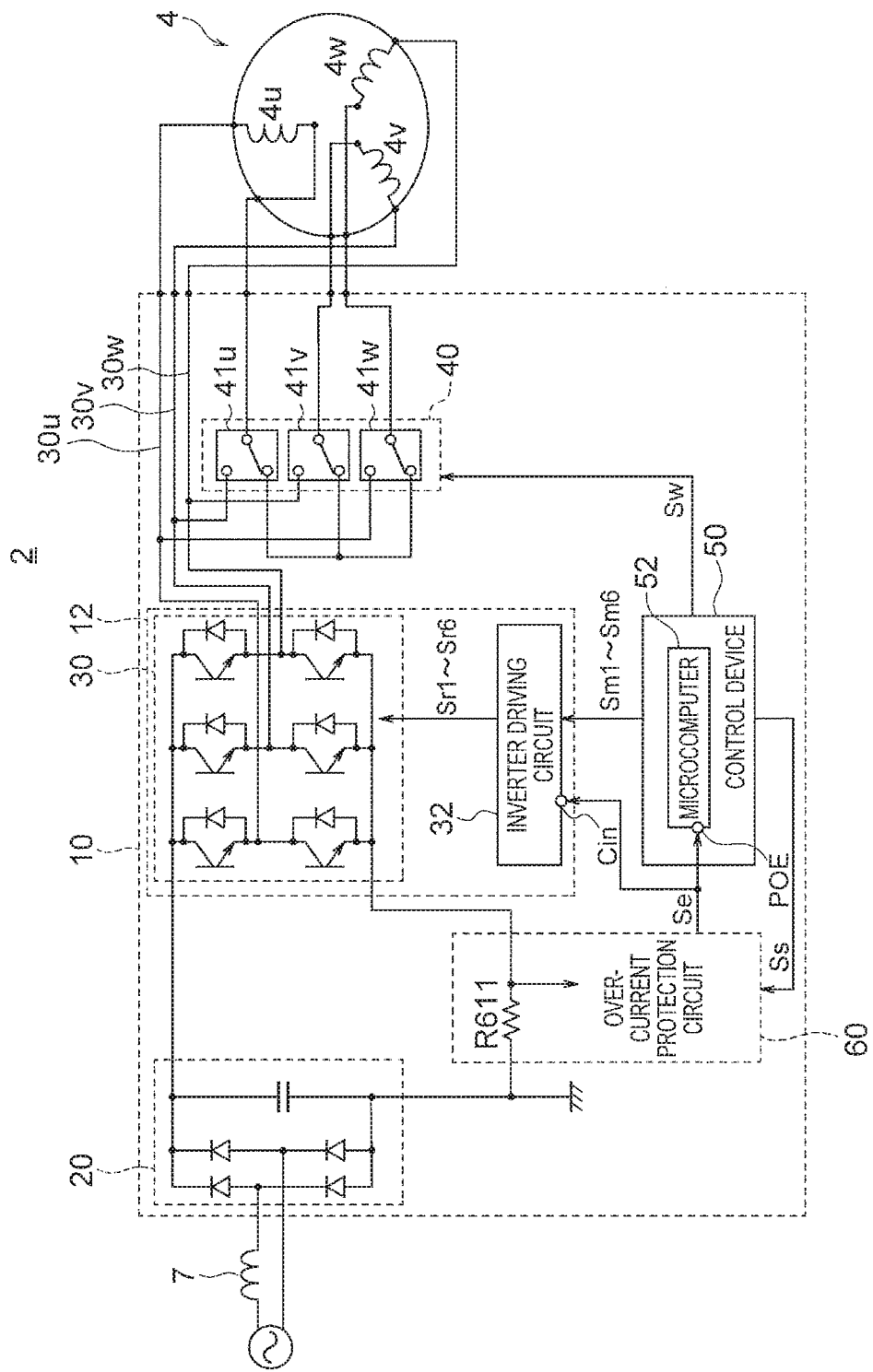
FIG. 1 is a schematic wiring diagram showing a motor driving apparatus of a first embodiment of the present invention, together with a motor.

FIG. 1 is a schematic wiring diagram showing a motor driving apparatus of a first embodiment of the invention, together with a motor.

The illustrated motor driving apparatus 2 is for driving a motor 4, and includes a converter 20, an inverter 30, an inverter driving circuit 32, a connection switching means 40, a control device 50, and an over-current protection circuit 60.

The combination of the inverter 30 and the inverter driving circuit 32 is configured of an IPM (intelligent power module) 12. The IPM 12, the converter 20, the connection switching means 40, the control device 50, and the over-current protection circuit 60 are mounted on an inverter board 10.

The converter 20 receives AC power from an AC power source 6, via a reactor 7, and performs rectification, smoothing, and the like, to output DC power. The converter 20 serves as a DC power source which supplies DC power to the inverter 30 described next.

Input terminals of the inverter 30 are connected to output terminals of the converter 20, and output terminals of the inverter 30 are respectively connected via output lines 30$u$, 30$v$, 30$w$ of U-phase, V-phase, and W-phase, to three-phase windings 4$u$, 4$v$, 4$w$ of the motor 4.

The inverter 30 has switching elements in six arms which are turned on and off according to drive signals Sr1 to Sr6 from the inverter driving circuit 32, to generate three-phase AC currents and supplies the three-phase AC currents to the motor 4.

The inverter driving circuit 32 generates the drive signals Sr1 to Sr6 based on on-off control signals, e.g., PWM signals Sm1 to Sm6, to be described later, from the control device 50.

Figure 2:
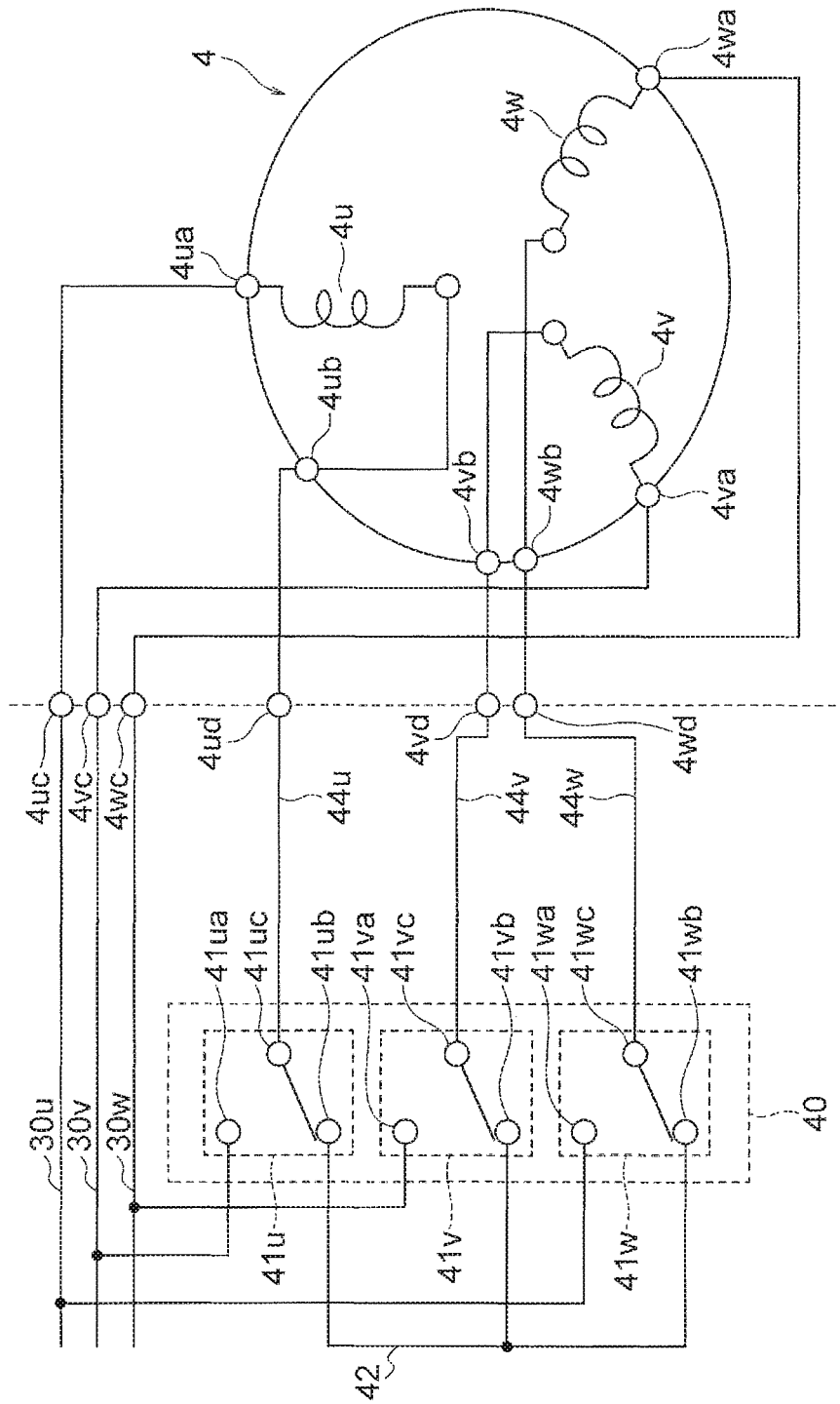
FIG. 2 is a wiring diagram showing in further detail the windings of the motor and the connection switching means in FIG. 1.

The motor 4 can operate in any of a plurality of connection states. In the following description, it is assumed that the plurality of connection states include a star connection state and a delta connection state. When the motor 4 is operable in a star connection state or a delta connection state, as the connection switching means 40, one capable of switching (selecting) between a star connection and a delta connection is used. FIG. 2 shows the windings of the motor and the connection switching means 40 in detail.

As shown, first ends 4$ua$, 0$va$, 4$wa$ and second ends 4$ub$, 4$vb$, 4$wb$ of the respective windings 4$u$, 4$v$, 4$w$ of three phases, i.e., U-phase, V-phase, and W-phase, are connected to external terminals 4$uc$, 4$vc$, 4$wc$, 4$ud$, 4$vd$, 4$wd$, and are thus connectable to the outside of the motor 4. Connected to the external terminals 4$uc$, 4$vc$, 4$wc$ are the output lines 30$u$, 30$v$, 30$w$ of the inverter 30.

In the illustrated example, the connection switching means 40 includes three selection switches 41$u$, 41$v$, 41$w$. The three selection switches 41$u$, 41$v$, 41$w$ are provided for three phases, respectively.

As the selection switches 41$u$, 41$v$, 41$w$, electromagnetically-driven mechanical switches are used. Such switches are also called relays, contactors, or the like, and assume different states between when a current is flowing through an excitation coil, not shown, or no current is flowing through the excitation coil.

A common contact 41$uc$ of the selection switch 41$u$ is connected via a lead line 44$u$ to the terminal 4$ud$, a normally-closed contact 41$ub$ is connected to a neutral point node 42, and a normally-open contact 41$ua$ is connected to the V-phase output line 30$v$ of the inverter 30.

A common contact 41vc of the selection switch 41v is connected via a lead line 44v to the terminal 4vd, a normally-closed contact 41vb is connected to the neutral point node 42, and a normally-open contact 41va is connected to the W-phase output line 30w of the inverter 30.

A common contact 41wc of the selection switch 41w is connected via a lead line 44w to the terminal 4wd, a normally-closed contact 41wb is connected to the neutral point node 42, and a normally-open contact 41wa is connected to the U-phase output line 30u of the inverter 30.

Normally, the selection switches 41u, 41v, 41w are in a state in which they are switched to the normally-closed contact side, as illustrated, that is, the common contacts 41uc, 41vc, 41wc are connected to the normally-closed contacts 41ub, 41vb, 41wb. In this state, the motor 4 is in the star connection state.

When a current flows through the excitation coil not shown, the selection switches 41u, 41v, 41w will be in a state, opposite to that illustrated, in which they are switched to the normally-open contact side, that is, the common contacts 41uc, 41vc, 41wc are connected to the normally-open contacts 41ua, 41va, 41wa. In this state, the motor 4 is in the delta connection state.

The control device 50 controls the connection switching means 40 to control the switching of the connection state of the motor, and performs on-off control over the inverter 30 to cause it to supply AC power to the motor 4. For the on-off control, the control device 50 generates the on-off control signals Sm1 to Sm6 and supplies them to the inverter driving circuit 32.

In the following description, it is assumed that PWM control is performed as the on-off control. When PWM control is performed, PWM signals Sm1 to Sm6 are supplied as the control signals to the inverter driving circuit 32. In this case, three-phase AC currents of a variable frequency and a variable voltage can be generated by the inverter 30. Another example of the on-off control is a rectangular wave drive control. In the rectangular wave drive control, control signals for causing a current to flow through the winding of each phase for 120 degrees are supplied. In this case, three-phase AC currents of a variable frequency can be generated by the inverter 30.

Figure 3:
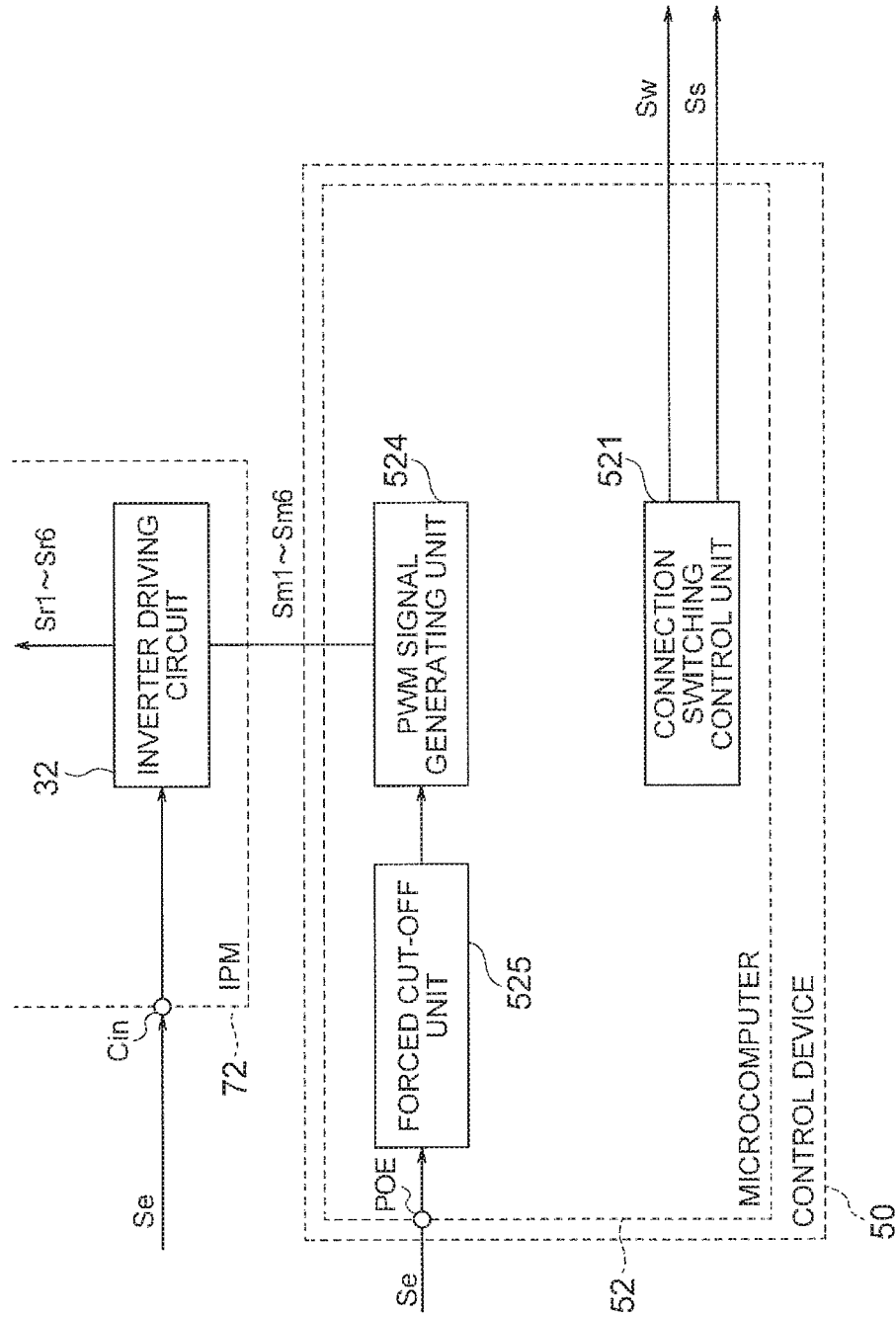
FIG. 3 is a block diagram schematically showing the configuration of the control device in FIG. 1.

As shown in FIG. 3, the control device 50 includes a microcomputer 52.

The microcomputer 52 includes a connection switching control unit 521, a PWM signal generating unit 524, and a forced cut-off unit 525.

The connection switching control unit 521 generates a connection selection signal Sw. This signal Sw designates whether the motor 4 is to be in the star connection state or in the delta connection state.

For example, the connection selection signal Sw is Low when designating the star connection, and High when designating the delta connection.

The connection selection signal Sw is supplied to the connection switching means 40 and is used for control over the state of the selection switches 41u, 41v, 41w. Specifically, when the connection selection signal Sw is Low, the selection switches 41u, 41v, 41w are in a state in which the common contact and the normally-closed contact are connected as shown in FIG. 2, while when the connection selection signal Sw is High, the selection switches 41u, 41v, 41w are in a state in which the common contact and the normally-open contact are connected, i.e., in a state opposite to the state shown in FIG. 2.

The connection switching control unit 521 also supplies an inverted connection selection signal Ss to the over-current protection circuit 60. The inverted connection selection signal Ss takes a logical value opposite to that of the connection selection signal Sw. That is, when the connection selection signal Sw is Low (when the star connection is designated), the inverted connection selection signal Ss is High, whereas when the connection selection signal Sw is High (when the delta connection is designated), the inverted connection selection signal Ss is Low.

The PWM signal generating unit 524 outputs the PWM signals Sm1 to Sm6 for performing PWM control over the inverter 30.

The PWM signals Sm1 to Sm6 are respectively used for on-off control over the switching elements in the six arms of the inverter 30.

The PWM signals Sm1 to Sm6 are maintained in a High state for the periods in which the corresponding switching elements are to be maintained in an on state, and are maintained in a Low state for the periods in which the corresponding switching elements are to be maintained in an off state.

As described above, the inverter driving circuit 32 generates the drive signals Sr1 to Sr6 for turning on or off the switching elements in the six arms of the inverter 30, respectively based on the PWM signals Sm1 to Sm6, and outputs the drive signals Sr1 to Sr6.

The drive signals Sr1 to Sr6 are generated corresponding to the PWM signals Sm1 to Sm6, respectively, and control the corresponding switching elements to be maintained in the on state while the corresponding PWM signals are High, and to be maintained in the off state while the corresponding PWM signals are Low.

The PWM signals Sm1 to Sm6 are of a magnitude (0 to 5V) of a signal level in a logic circuit, whereas the drive signals Sr1 to Sr6 have a magnitude of a voltage level, e.g., 15V, required to control the switching elements.

The inverter driving circuit 32 is connected to an over-current cut-off port Cin of the IPM 12. When a signal is input to the over-current cut-off port Cin (when the signal becomes High), the inverter driving circuit 32 turns off the switching elements in all the arms of the inverter 30.

The forced cut-off unit 525 is connected to an inverter output abnormality cut-off port POE of the microcomputer 52. When a signal is input to the port POE (when the signal becomes High), the forced cut-off unit 525 causes the PWM signal generating unit 524 to stop outputting the PWM signals Sm1 to Sm6. When the PWM signals Sm1 to Sm6 all cease to be input, the inverter driving circuit 32 turns off the switching elements in all the arms of the inverter 30.

When the switching elements are turned off, the inverter 30 ceases to output the AC power (the inverter 30 is turned into a stop state).

The forced cut-off unit 525 is configured of hardware, which operates independently of the control programs executed by the microcomputer 52.

The process of stopping the output of the PWM signals Sm1 to Sm6 from the PWM signal generating unit 524 responsive to the signal to the inverter output abnormality cut-off port POE is performed by the forced cut-off unit 525 configured of hardware, without interaction with the process by software of the microcomputer 52, and can therefore be carried out at a high speed.

The reason why the processes of stopping the inverter 30 are performed in duplicate as described above is to perform the operation at a high speed, and with less possibility of failure.

Figure 4:
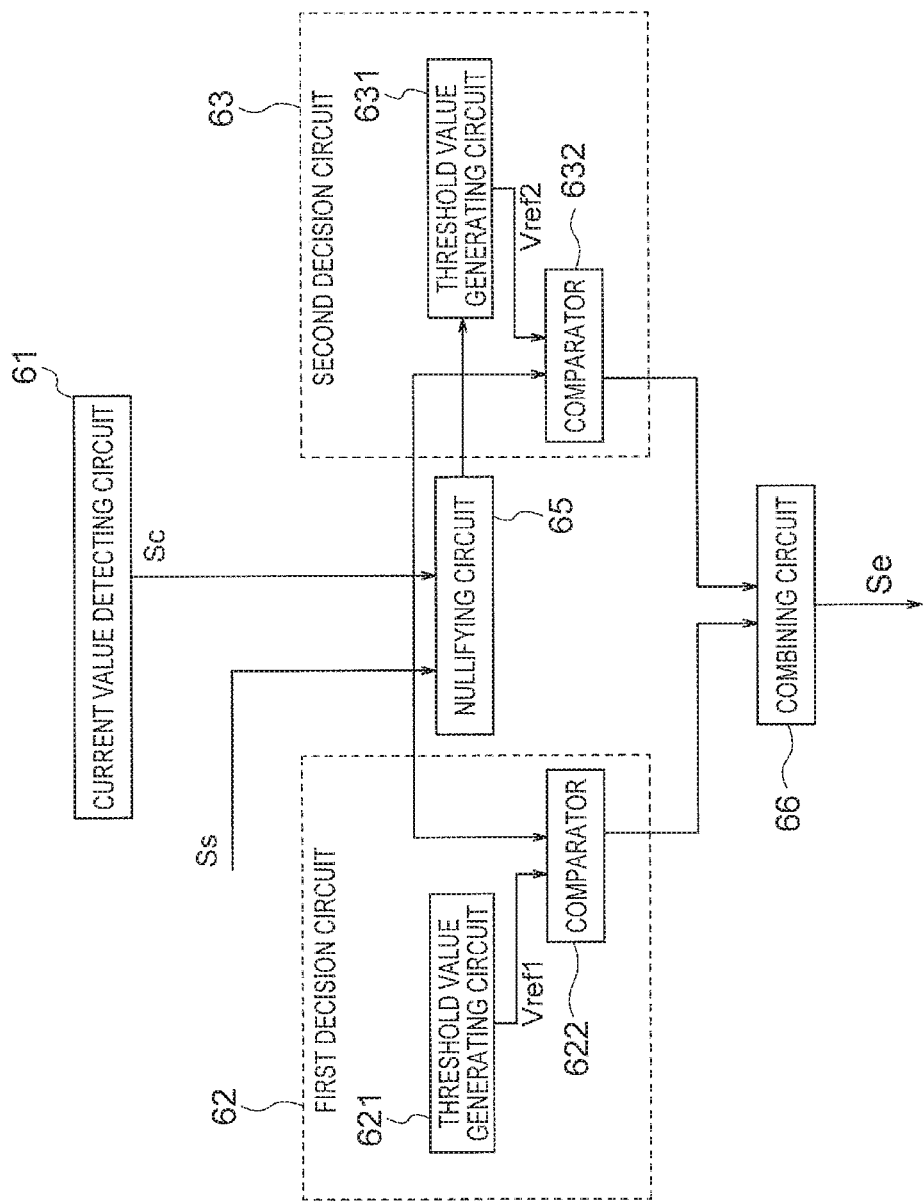
FIG. 4 is a block diagram schematically showing the configuration of the over-current protection circuit in FIG. 1.
Figure 5:
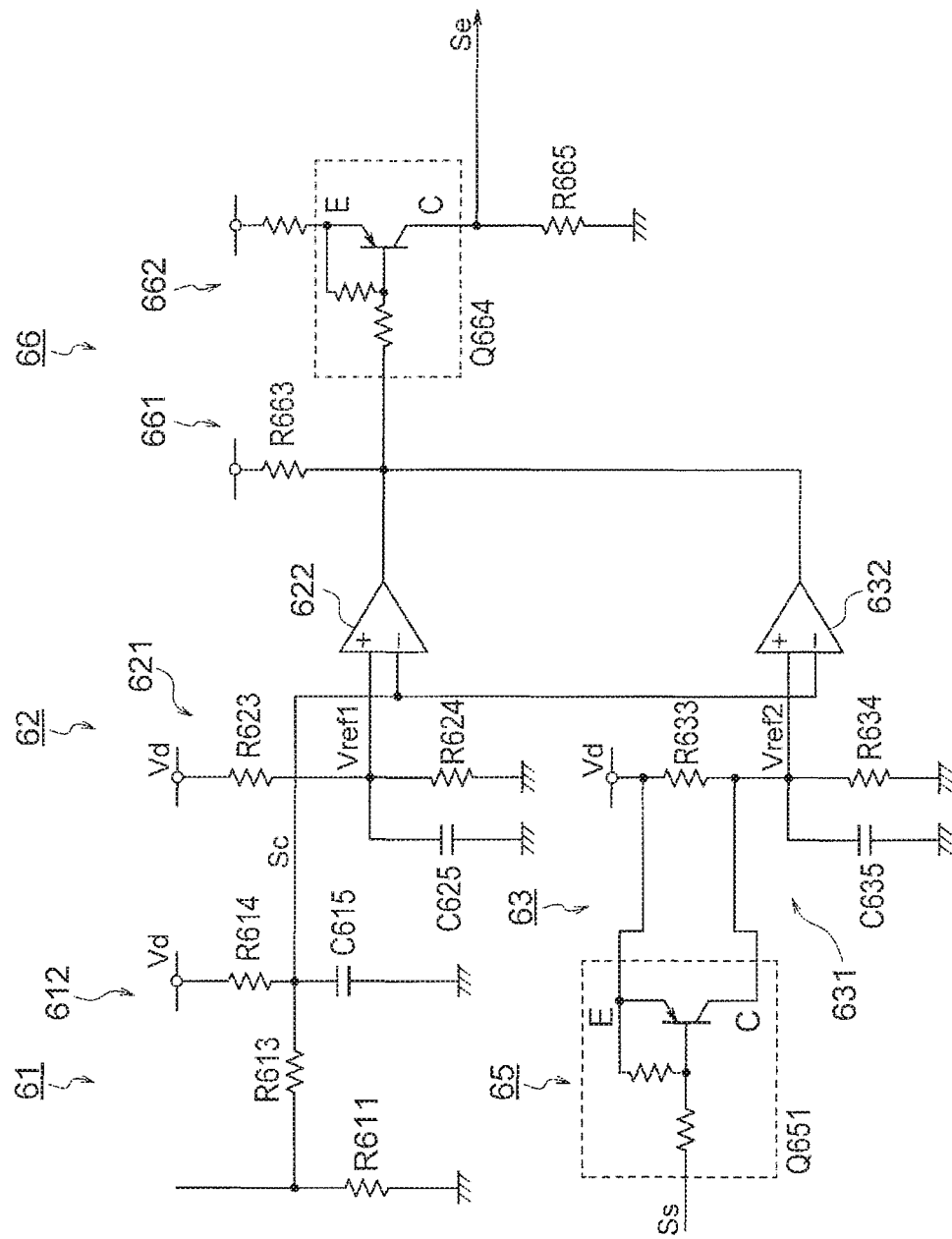
FIG. 5 is a wiring diagram of the over-current protection circuit in FIG. 4.

For example, the over-current protection circuit 60 is configured as shown in FIG. 4 and FIG. 5.

FIG. 4 is a block diagram schematically showing the configuration of the over-current protection circuit 60, and FIG. 5 is a wiring diagram of the over-current protection circuit 60.

As shown in FIG. 4, the over-current protection circuit 60 includes a current value detecting circuit 61, a first decision circuit 62, a second decision circuit 63, a nullifying circuit 65, and a combining circuit 66.

As shown in FIG. 5, the current value detecting circuit 61 includes a resistor R611 and a smoothing circuit 612.

The resistor R611 is inserted in the bus line connecting the output terminal of the converter 20 and the input terminal of the inverter 30, and has a first end connected to the ground. The smoothing circuit 612 includes resistors R613, R614 and a capacitor C615.

A first end of the resistor R613 is connected to a second end of the resistor R611.

A first end of the resistor R614 is connected to a control power source Vd, and a second end of the resistor R614 is connected to a second end of the resistor R613.

A first terminal of the capacitor C615 is connected to the second end of the resistor R613, and a second terminal of the capacitor C615 is connected to the ground.

In the current value detecting circuit 61, a voltage obtained by smoothing the voltage between the two ends of the resistor R611 appears between the two terminals of the capacitor C615, and the voltage between the two terminals of the capacitor C615 is supplied as a signal (current value signal) Sc indicating the detected current value to the first decision circuit 62 and the second decision circuit 63.

The first decision circuit 62 includes a first threshold value generating circuit 621, and a comparator 622. The comparator 622 is formed of an operational amplifier, for example.

The first threshold value generating circuit 621 includes a voltage-dividing circuit including resistors R623 and R624 which are connected in series with each other, and a smoothing capacitor C625.

A first end of the resistor R623 is connected to the control power source Vd, a first end of the resistor R624 is connected to a second end of the resistor R623, and a second end of the resistor R624 is connected to the ground. The capacitor C625 is connected in parallel with the resistor R624.

The voltage (control voltage) Vd of the control power source Vd is divided by the voltage-dividing circuit including the resistors R623 and R624, and a voltage VtΔ dependent on the division ratio appears at a junction between the resistor R623 and the resistor R624, i.e., the voltage division node of the voltage-dividing circuit.

The voltage VtΔ is given by:

$$Vt\Delta = Vd \times R624/(R623+R624) \quad (1)$$

The voltage VtΔ is a threshold value (first threshold value) for the delta connection, and is supplied as a first reference value Vref1 to a non-inverted input terminal (plus terminal) of the comparator 622.

Supplied to an inverted input terminal (minus terminal) of the comparator 622 is the current value signal Sc from the current value detecting circuit 61.

The comparator 622 compares the current value signal Sc with the reference value Vref1, and its output becomes Low if the current value signal Sc is higher than the reference value Vref1; otherwise its output becomes High.

The second decision circuit 63 includes a second threshold value generating circuit 631 and a comparator 632. The comparator 632 is formed of an operational amplifier, for example.

The second threshold value generating circuit 631 includes a voltage-dividing circuit including resistors R633 and R634 which are connected in series with each other, and a smoothing capacitor C635.

A first end of the resistor R633 is connected to the control power source Vd, a first end of the resistor R634 is connected to a second end of the resistor R633, and a second end of the resistor R634 is connected to the ground. The capacitor C635 is connected in parallel with the resistor R634.

The control voltage Vd is divided by the voltage-dividing circuit including the resistors R633 and R634, and a voltage VtY dependent on the division ratio appears at a junction between the resistor R633 and the resistor R634, i.e., the voltage division node of voltage-dividing circuit.

The voltage VtY is given by:

$$VtY = Vd \times R634/(R633+R634) \quad (2)$$

The voltage VtY is a threshold value (second threshold value) for the star connection, and is supplied as a second reference value Vref2 to a non-inverted input terminal (plus terminal) of the comparator 632, at the time of the star connection.

There is a following relation between the above-mentioned VtΔ and VtY:

$$Vt\Delta = \sqrt{3} \times VtY \quad (3)$$

That is, the resistance values of the resistors R623, R624, R633, R634 are so set as to satisfy the equation (3).

The configuration may be such that VtΔ is smaller than √3 times VtY (but larger than VtY). This is because a circulating current through the windings in the case of the delta connection, and the inverter current is not affected by the circulating current.

Supplied to an inverted input terminal (minus terminal) of the comparator 632 is the current value signal Sc from the current value detecting circuit 61.

The comparator 632 compares the current value signal Sc with the reference value Vref2, and its output becomes Low if the current value signal Sc is higher than the reference value Vref2; otherwise its output becomes High.

The nullifying circuit 65 nullifies the comparison with the threshold value (threshold value corresponding to the star connection) VtY in the second decision circuit 63, and includes an npn-type digital transistor Q651. The digital transistor Q651 has an emitter and a collector respectively connected to the first and second ends of the resistor R633.

The digital transistor Q651 has a base to which the inverted connection selection signal Ss output from the control device 50 is input. The digital transistor Q651 is in an off state when the signal Ss is High (at the time of the star connection) and is in an on state when the signal Ss is Low (at the time of the delta connection).

When the digital transistor Q651 is off (at the time of the star connection), the above-mentioned threshold value VtY is generated in the second threshold value generating circuit 631, and is supplied as the second reference value Vref2 to the comparator 632, as described above.

When the digital transistor Q651 is on (at the time of the delta connection), the resistor R633 is short-circuited by the digital transistor Q651, so that a potential close to the control voltage Vd, i.e., a potential Vp=(Vd−Von) which is lower than the control voltage Vd by a voltage drop Von between the emitter and the collector of the digital transistor Q651 in the on state appears at the junction between the resistor R633 and the resistor R634, i.e., the voltage division node of the voltage-dividing circuit. This potential Vp=(Vd−Von) is supplied, in place of the threshold value VtY, as the second reference value Vref2, to the non-inverted input terminal (plus terminal) of the comparator 632.

The comparator 632 performs the comparison of the current value signal Sc using Vp=(Vd−Von), in place of the threshold value VtY, as the second reference value Vref2.

As has been described, when the digital transistor Q651 is off, the threshold value VtY is used as the reference value Vref2, whereas when the digital transistor Q651 is on, Vp=(Vd−Von) is used as the reference value Vref2.

The combining circuit 66 includes a wired OR circuit 661 and an inverting circuit 662.

The wired OR circuit 661 includes a resistor R663 having a first end connected to the control power source Vd, and a second end connected to output terminals of the comparators 622 and 632.

When at least one of the output terminals of the comparators 622 and 632 is Low (the impedance between the output terminal and the ground being Low), the output of the wired OR circuit 661 (second end of the resistor R663) is Low (of a Low level); when the output terminals of the comparators 622 and 632 are both High, the output of the wired OR circuit 661 (second end of the resistor R663) is High.

The inverting circuit 662 includes a digital transistor Q664 having an emitter connected to the control power source Vd, a base connected to the output of the wired OR circuit (second end of the resistor R663), and a resistor R665 having a first end connected to a collector of the digital transistor Q664 and a second end connected to the ground.

Appearing at the collector terminal of the digital transistor Q664 is a signal obtained by inverting the logic state of the output of the wired OR circuit 661.

This signal (over-current detection signal) Se is the output of the inverting circuit 662, and also the output of the combining circuit 66, and accordingly, the output of the over-current protection circuit 60.

The output of the over-current protection circuit 70 is supplied to the over-current cut-off port Cin of the IPM 12, and also supplied to the inverter output abnormality cut-off port POE of the microcomputer 52.

When a signal is supplied to the over-current cut-off port Cin of the IPM 12 (when the signal becomes High), the inverter driving circuit 32 causes the switching elements in all the arms of the inverter 30 to be turned off.

Also, when a signal is supplied to the inverter output abnormality cut-off port POE of the microcomputer 52 (when the signal becomes High), the PWM signal generating unit 524 ceases to output the PWM signals Sm1 to Sm6, by the action of the forced cut-off unit 525, and accordingly, no PWM signals are supplied to the inverter driving circuit 32. As a result, the inverter driving circuit 32 causes the switching elements in all the arms of the inverter 30 to be off.

When the switching elements in the respective arms of the inverter 30 are off, the inverter 30 is in a state (stop state) in which no AC power is output.

As has been described, when the output of the combining circuit 66 becomes High, the processes of stopping the inverter are performed in duplicate.

Figure 6:
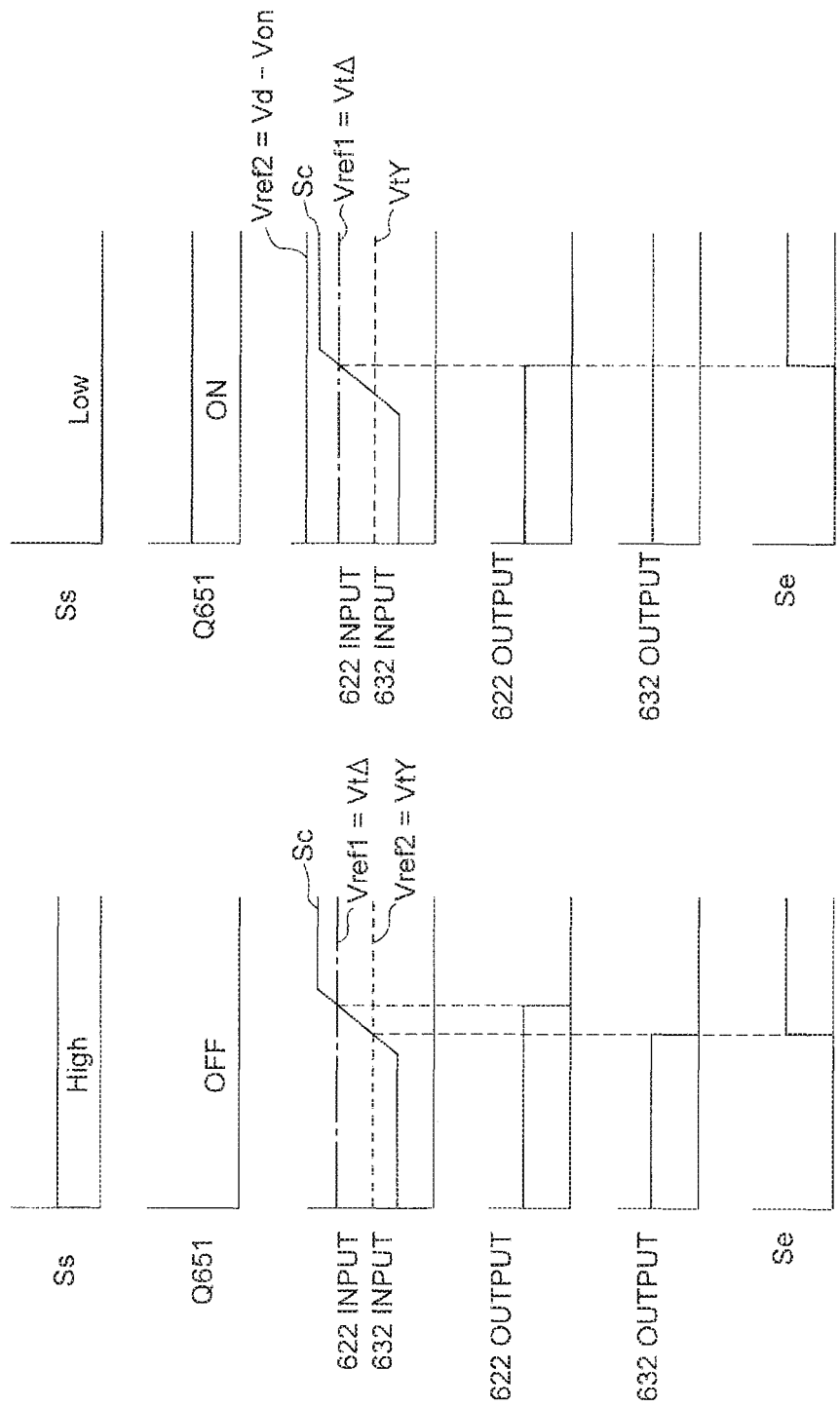
FIGS. 6(a) and 6(b) are time charts showing the operation of the over-current protection circuit in FIG. 4 and FIG. 5.

The operations of the decision circuits 62, 63, and the combining circuit 66 will now be described with reference to FIG. 6(a) and FIG. 6(b).

As is described above, the inverted connection selection signal Ss is supplied from the connection switching control unit 521 of the control device 50 to the base of the digital transistor Q651.

This signal Ss is High as shown in FIG. 6(a) at the time of the star connection, and is Low as shown in FIG. 6(b) at the time of the delta connection.

Accordingly, the digital transistor Q651 is off as shown in FIG. 6(a) at the time of the star connection, and is on as shown in FIG. 6(b) at the time of the delta connection.

Accordingly, supplied to the plus terminal of the comparator 632 as the second reference value Vref2 is VtY (FIG. 6(a)) at the time of the star connection, and is Vp=(Vd−Von) (FIG. 6(b)) at the time of the delta connection.

Supplied to the plus terminal of the comparator 622 as the first reference value Vref1 is VtΔ both at the time of the star connection and at the time of the delta connection.

At the time of the star connection, VtY is supplied as the second reference value Vref2 to the plus terminal of the comparator 632 (FIG. 6(a)), as described above. Also, there is a relation: VtY<VtΔ as described above.

Therefore, when the input current of the inverter 30 gradually increases, and accordingly the current value signal Sc gradually increases, the comparator 632 will find that the current value signal Sc has become larger than the reference value Vref2, and its output becomes Low.

Then, at that time point, the output of the wired OR circuit 661 becomes Low. As a result, the output Se of the inverting circuit 662 (accordingly, the output of the combining circuit 66) becomes High.

In this way, at the time of the star connection, the over-current detection signal Se becomes High at the time point when the current value signal Sc becomes larger than the threshold value VtY set for the star connection.

At the time of the delta connection, Vp=(Vd−Von) is supplied as the second reference value Vref2 to the plus terminal of the comparator 632 (FIG. 6(b)), as described above.

It is so configured that the current value signal Sc does not exceed Vp=(Vd−Von), so that the output of the comparator 632 is maintained High.

Therefore, when the input current of the inverter 30 gradually increases, and accordingly the current value signal Sc gradually increases, the comparator 622 will find that the current value signal Sc has become larger than the reference value Vref1, and its output becomes Low.

Then, at that time point, the output of the wired OR circuit 661 becomes Low. As a result, the output Se of the inverting circuit 662 (accordingly, the output of the combining circuit 66) becomes High.

In this way, at the time of the delta connection, the over-current detection signal Se becomes High at the time point when the current value signal Sc becomes larger than the threshold value VtΔ set for the delta connection.

In the manner described above, at the time of the delta connection, the comparison in the second decision circuit 63 using the threshold value VtY corresponding to the star connection is nullified. It is therefore possible to perform over-current detection, both at the time of the star connection and at the time of the delta connection, based on the result of the comparison using the threshold value appropriate for each state (threshold value corresponding to the particular connection state).

Incidentally, when the over-current detection signal Se becomes High, the inverter 30 ceases to operate, as described above, with the result that the current value signal Sc decreases. But in FIG. 6(a) and FIG. 6(b), the current value signal Sc is not shown to decrease for easier understanding of the operations of the comparators 622, 632. This is also true for FIG. 10, FIG. 13(a), FIG. 13(b), and FIG. 15 to be described later.

The nullifying circuit 65 which nullifies the comparison with the threshold value can be formed of a digital transistor. Digital transistors are less expensive, so that the cost can be reduced. In addition, the decision circuits 62, 63 can be formed of a comparator and a resistor, and the comparator can be formed of an operational amplifier which is less expensive, so that the cost can be reduced.

The generation of the threshold values VtΔ, VtY in the decision circuits 62, 63 is not affected by the circuit constants of the digital transistor. It is therefore possible to perform the generation of the threshold values and the comparisons using the threshold values accurately. Accordingly, the over-current protection can be achieved with high accuracy.

Because the over-current protection can be achieved with high accuracy, it is possible to set the over-current protection level against the demagnetizing current as high as possible, and it is possible to increase the output power.

Where a plurality of decision circuits are provided, if their outputs were to be input to the microcomputer or the IPM, the microcomputer, the IPM, or the like would have to have a plurality of input terminals. In general, commonly available microcomputers (general-purpose products) are provided with just one inverter output abnormality cut-off port POE, and commonly available IPMs (general purpose products) are provided with just one over-current cut-off port Cin. In a configuration in which the outputs of a plurality of decision circuits are input to a microcomputer, or IPM, general-purpose products such as those described above cannot be used.

In contrast, according to the present invention, the decision results by a plurality of decision circuits are combined and output, so that a microcomputer having just one inverter output abnormality cut-off port POE may be used, and an IPM having just one over-current cut-off port Cin may be used.

Moreover, the over-current protection circuit 60, in particular, the decision circuits 62, 63, are configured of hardware, so that the operation for the protection is performed at a high speed.

Furthermore, the forced cut-off unit 525 is configured of hardware, and operates independently of the control programs of the microcomputer 52, so that it can perform the operation at a high speed, and even when a runaway of the microcomputer occurs, it is possible to stop the supply of the drive signals without fail.

Accordingly, it is possible to construct a highly reliable system.

Second Embodiment

Figure 7:
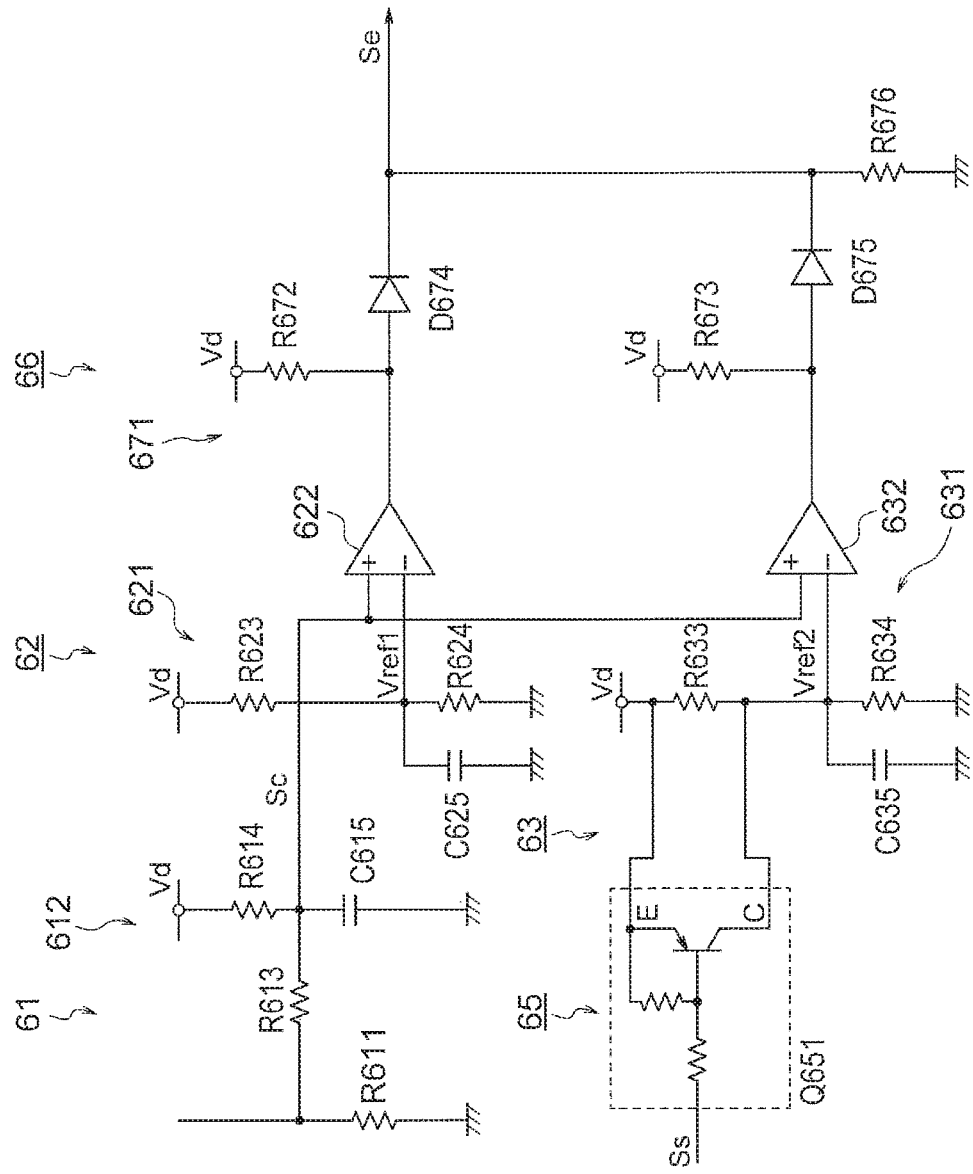
FIG. 7 is a wiring diagram showing the over-current protection circuit used in the second embodiment of the present invention.

FIG. 7 is a wiring diagram showing an over-current protection circuit used in a second embodiment.

The over-current protection circuit 60 of the second embodiment is generally identical to that shown in FIG. 4 and FIG. 5, but differs in the following respects.

First, the current value signal Sc output from the current value detecting circuit 61 is supplied to the plus terminals of the comparator 622 and the comparator 632, the reference value Vref1 from the first threshold value generating circuit 621 is supplied to the minus terminal of the comparator 622, and the reference value Vref2 from the second threshold value generating circuit 631 is supplied to the minus terminal of the comparator 632.

Moreover, the combining circuit 66 is formed of a diode OR circuit 671.

The diode OR circuit 671 includes resistors R672, R673, diodes D674, D675, and a resistor R676.

The resistor R672 has a first end connected to the control power source Vd, and a second end connected to the output terminal of the comparator 622. The diode D674 has an anode connected to the output terminal of the comparator 622, and a cathode connected to a first end of the resistor R676.

The resistor R673 has a first end connected to the control power source Vd, and a second end connected to the output terminal of the comparator 632. The diode D675 has an anode connected to the output terminal of the comparator 632, and has a cathode connected to the first end of the resistor R676.

A second end of the resistor R676 is connected to the ground.

When at least one of the output terminals of the comparators 622 and 632 is High, the output of the diode OR circuit 671 (potential at the first end of the resistor R676) is High; when both of the output terminals of the comparators 622 and 632 are Low, the output of the diode OR circuit 671 (potential at the first end of the resistor R676) is Low.

The signal at the first end of the resistor R676 is the output of the diode OR circuit 671, and is also the output of the combining circuit 66, and accordingly the output of the over-current protection circuit 60.

As in the first embodiment, the inverted connection selection signal Ss supplied to the base of the digital transistor Q651 is supplied from the control device 50.

The operation of the circuit shown in FIG. 7 when the inverter current gradually increases is similar to that described with reference to FIGS. 6(a) and 6(b) in connection with the first embodiment. However, the logic values of the outputs of the comparators 622, 632 are opposite to those in FIGS. 6(a) and 6(b).

Third Embodiment

Figure 8:
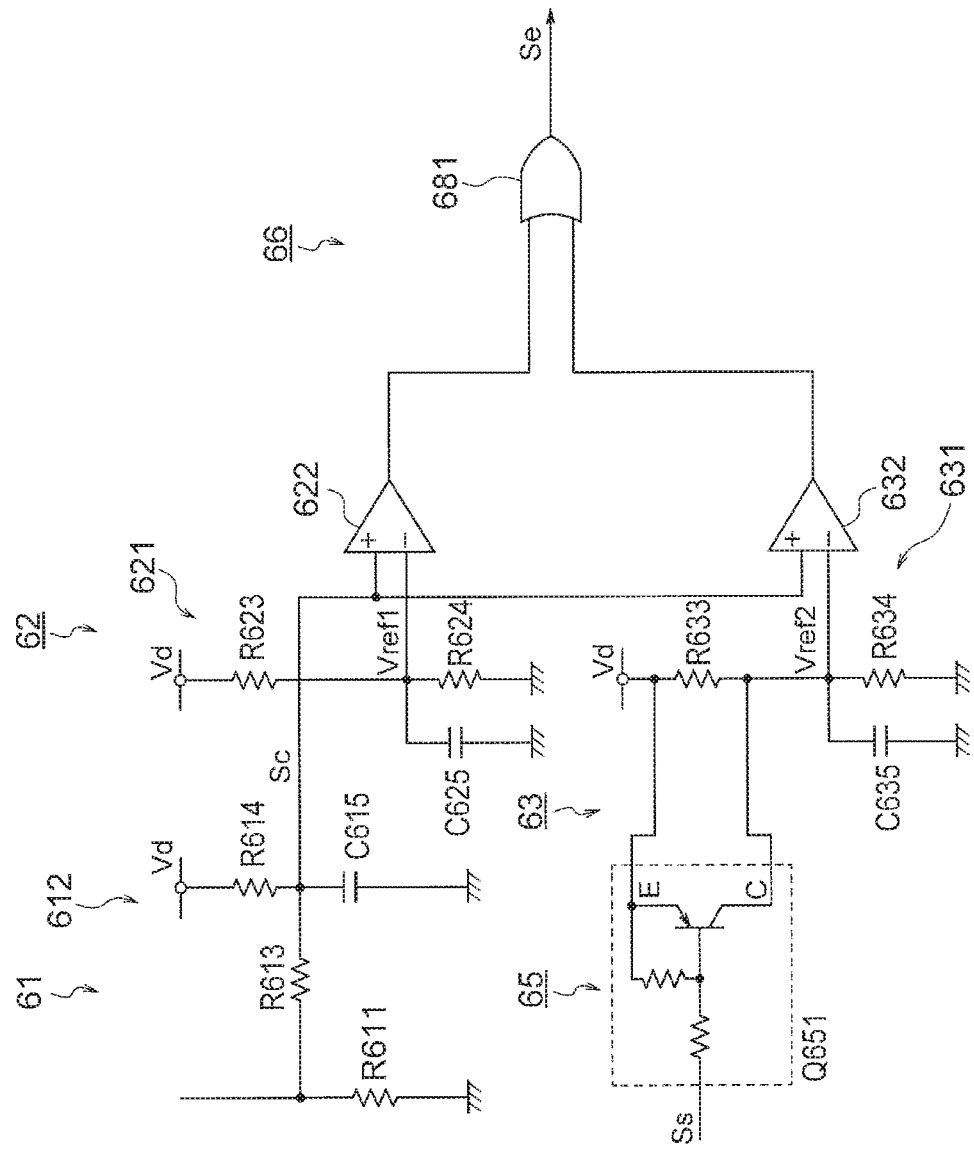
FIG. 8 is a wiring diagram showing the over-current protection circuit used in the third embodiment of the present invention.

In the second embodiment described above, the combining circuit 66 is formed of a diode OR circuit 671; but an OR circuit 681 configured by combining transistors, e.g., MOS transistors, may be used. An example of such a configuration is shown in FIG. 8.

Variation

In the first to third embodiments, the comparison in the second decision circuit 63 using the threshold value VtY is nullified, by having Vp=(Vd−Von) appear at the voltage division node in the threshold value generating circuit 631 in the second decision circuit 63. This however is not indispensable. What is essential is that a potential Vp which is higher than the threshold value VtΔ output from the threshold value generating circuit 621 in the first decision circuit 62 appears at the voltage division node of the threshold value generating circuit in the second decision circuit 63, and is supplied as the reference value Vref2 to the comparator 632.

Figure 9:
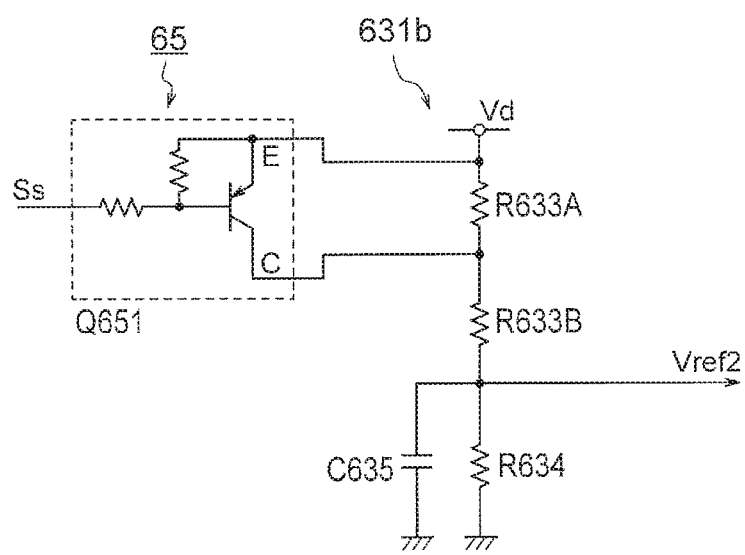
FIG. 9 is a wiring diagram showing an example of the threshold value generating circuit and the nullifying circuit of the second decision circuit used in a variation of the first to third embodiments.

For instance, the threshold value generating circuit 631 in the second decision circuit 63 in FIG. 5 may be replaced with a threshold value generating circuit 631b shown in FIG. 9, and a nullifying circuit 65 may be connected to the threshold value generating circuit 631b, as shown in FIG. 9.

The threshold value generating circuit 631b shown in FIG. 9 is similar to the threshold value generating circuit 631 shown in FIG. 5, but the resistor R633 is replaced with a series connection of resistors R633A and R633B, and accordingly, a voltage-dividing circuit is formed of the resistors R633A, R633B, R634 connected in series with each other, and the digital transistor Q651 is provided to short-circuit the resistor R633A (resistor which is connected between the voltage division node and the control power source).

For example, the resistance values R633A, R633B of the resistors R633A, R633B are so set as to satisfy the following relationship with the resistance R633 of the resistor R633 in the first embodiment:

$$R633A+R633B=R633 \qquad (4)$$

In this case, the operation when the digital transistor Q651 is off (the operation at the time of the star connection) is identical to that explained with reference to FIG. 6(a) in connection with the circuit shown in FIG. 5.

Figure 10:
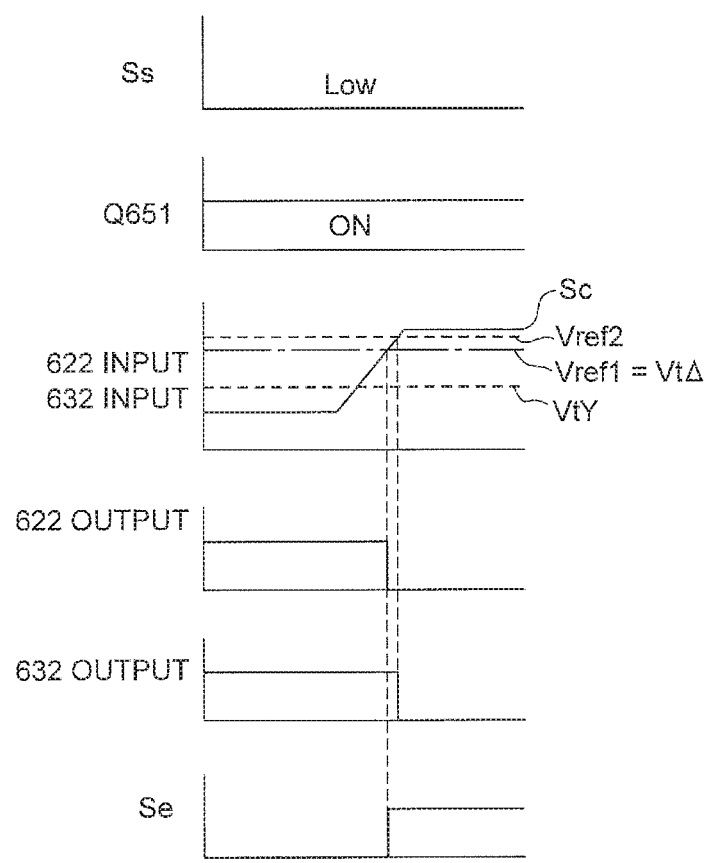
FIG. 10 is a time chart showing the operation of the over-current protection circuit provided with the threshold value generating circuit and the nullifying circuit in FIG. 9.

When the digital transistor Q651 is on (at the time of the delta connection), a potential given by:

$$Vp=(Vd-Von)\times R634/(R633B+R634) \qquad (5)$$

appears, as shown in FIG. 10, at the voltage division node in the threshold value generating circuit 631b, and is supplied as the reference value Vref2 to the comparator 632.

Because Vp is larger than VtΔ, at the time of the delta connection, the comparator 622 will find that Sc has become larger than VtΔ before the comparator 632 finds that Sc has become larger than Vp. Accordingly, the over-current detection signal Se becomes High at the time point when Sc becomes larger than VtΔ. Thus, the over-current detection signal Se becomes High at the time point when Sc becomes larger than VtΔ as is the case of the circuit shown in FIG. 5, described with reference to FIG. 6(b).

In designing, it is desirable that the constants of the elements be so set that Vp is sufficiently larger than VtΔ taking account of the variations of the constants of the elements. That is, it is desirable that the resistance values of the resistors R633B, R634 be so set that Vp given by the equation (5) is larger than VtΔ plus a margin.

Fourth Embodiment

In the first, second, and third embodiments, the comparison of the current value signal Sc with the threshold value VtY for the star connection in the second decision circuit 63 is nullified at the time of the delta connection. Alternatively, the comparison of the current value signal Sc with the threshold value VtΔ for the delta connection in the first decision circuit 62 may be nullified at the time of the star connection. In this case, for example, the reference value is set very low in the first decision circuit 62 at the time of the star connection, so that the decision result keeps indicating that "the current value signal Sc is larger than the reference value", and the decision result by the first decision circuit 62 and the decision result by the second decision circuit 63 are ANDed.

In such a case, the effects similar to those described above can be obtained.

Figure 11:
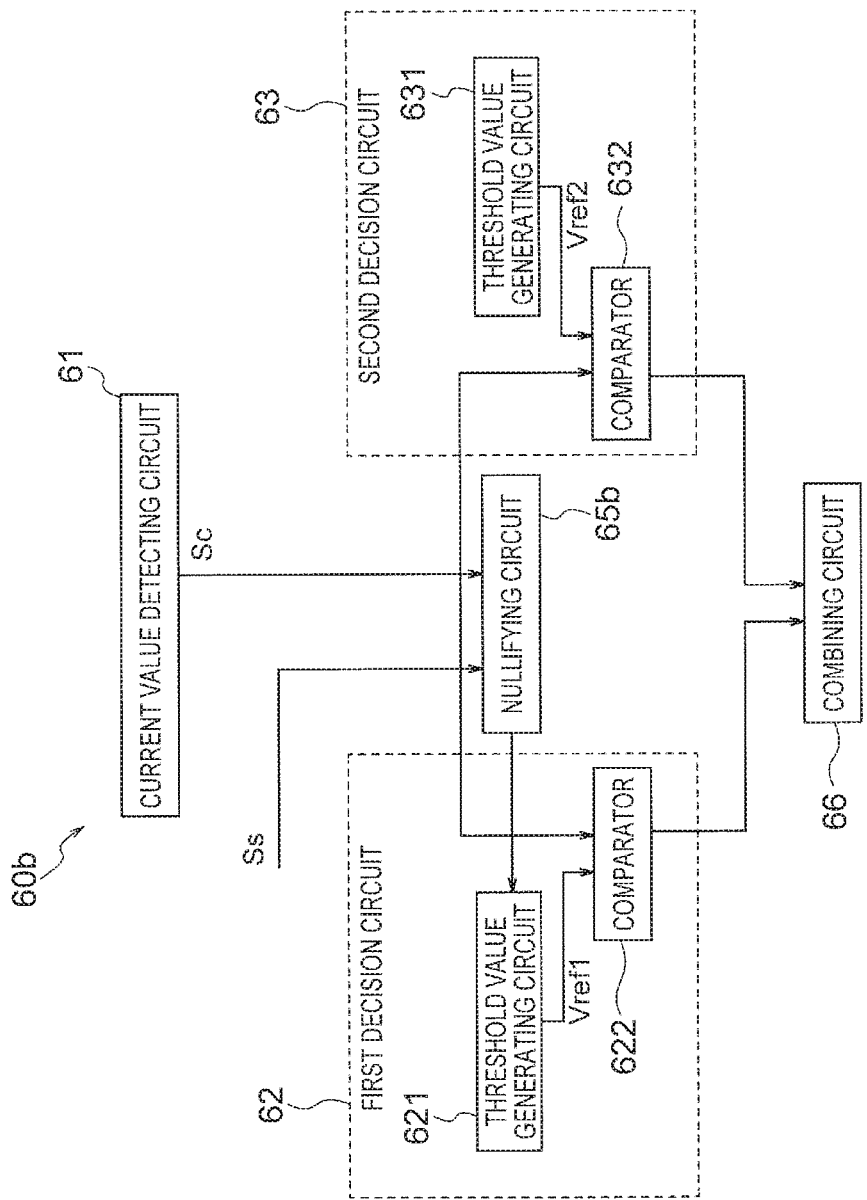
FIG. 11 is a block diagram schematically showing the configuration of the over-current protection circuit used in the fourth embodiment of the present invention.
Figure 12:
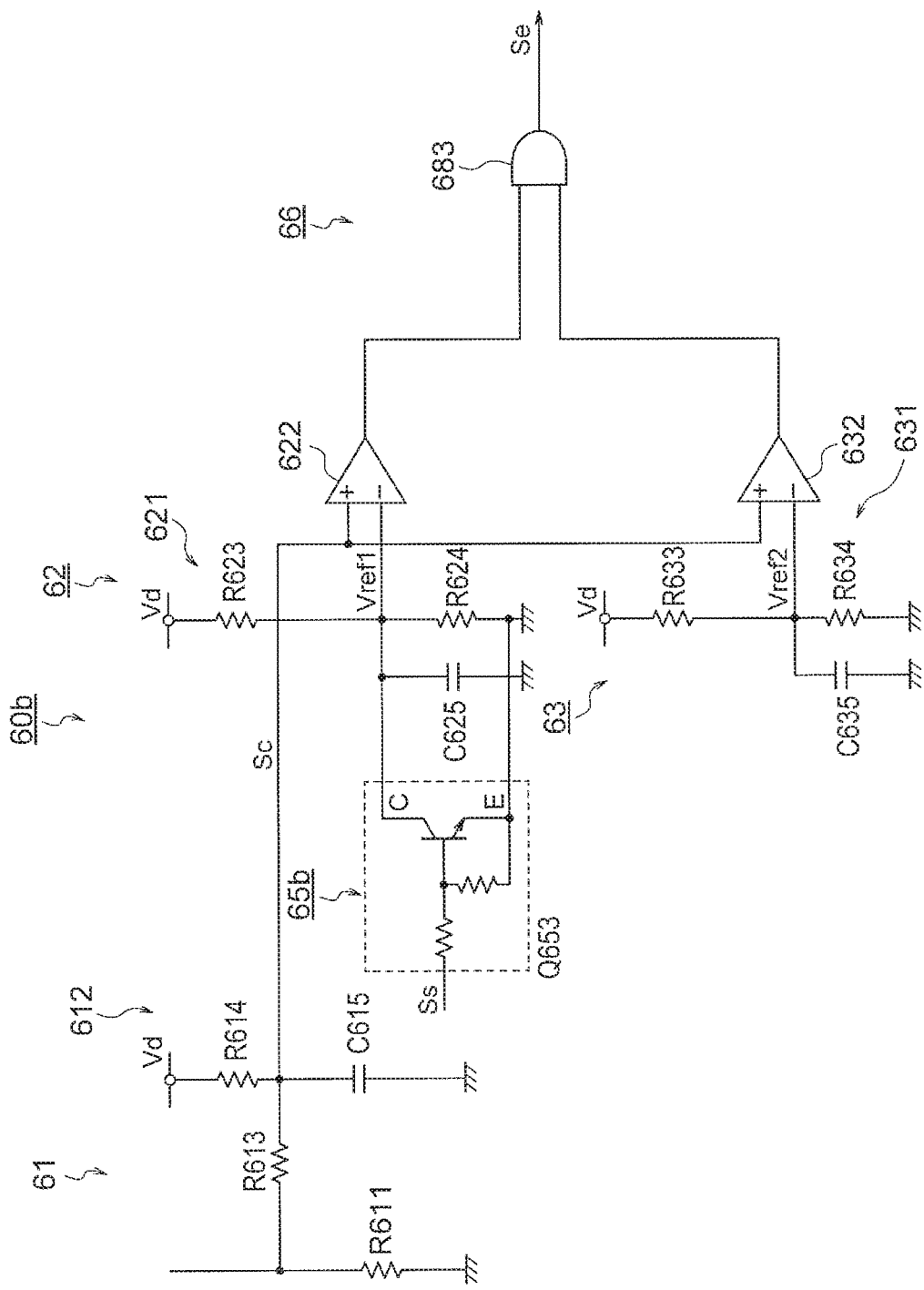
FIG. 12 is a wiring diagram of the over-current protection circuit in FIG. 11.
Figure 13:
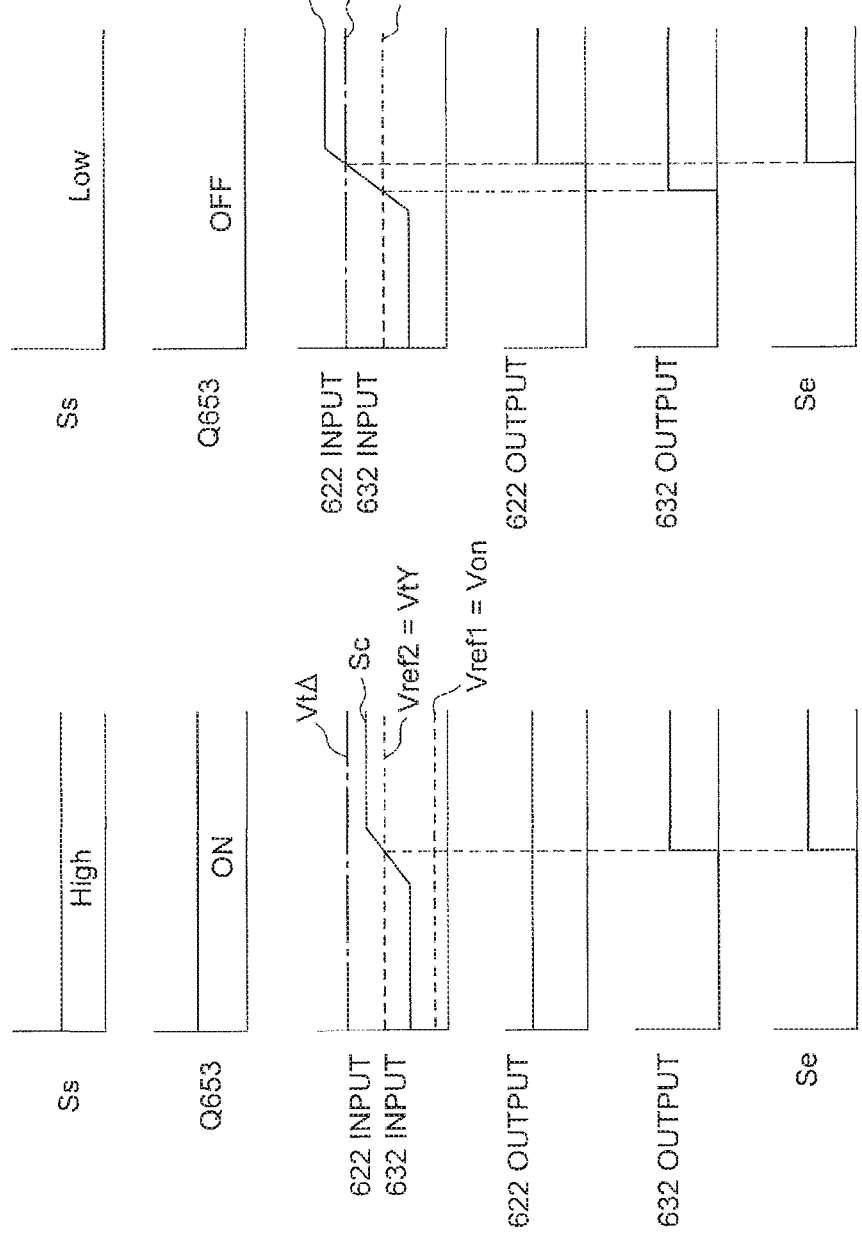
FIGS. 13(a) and 13(b) are time charts showing the operation of the over-current protection circuit in FIG. 11 and FIG. 12.

An example of such a configuration is shown in FIG. 11 and FIG. 12.

FIG. 11 is a block diagram schematically showing the configuration of an over-current protection circuit 60b of the fourth embodiment, and FIG. 12 is a wiring diagram of the over-current protection circuit 60b.

The over-current protection circuit 60b shown in FIG. 11 is generally identical to the over-current protection circuit 60 used in the first to third embodiments, but the nullifying circuit 65 is replaced with a nullifying circuit 65.

The nullifying circuit 65b is provided to nullify the comparison in the first decision circuit 62 rather than the second decision circuit 63, and differs in this respect from the first to third embodiments.

Also, whereas the nullifying circuit 65 in the first to third embodiments is formed of a pnp-type digital transistor Q651, the nullifying circuit 65b in this embodiment is formed of an npn type digital transistor Q653.

In the second decision circuit 63, the control voltage Vd is divided by the voltage-dividing circuit including the resistors R633 and R634, a voltage VtY dependent on the voltage division ratio appears at the voltage division node.

The voltage VtY is given by:

$$VtY=Vd\times R634/(R633+R634) \qquad (6)$$

The voltage VtY is a threshold value (second threshold value) for the star connection, and is supplied as the second reference value Vref2 to the inverted input terminal (minus terminal) of the comparator 632.

The digital transistor Q653 in the nullifying circuit 65b has a collector and an emitter respectively connected to a first end and a second end of the resistor R624.

Supplied to a base of the digital transistor Q653 is the inverted connection selection signal Ss from the control device 50 described in the first to third embodiments. The digital transistor Q653 is in the off state when the signal Ss is Low (at the time of the delta connection), and is in the on state when the signal Ss is High (at the time of the star connection).

When the digital transistor Q653 is off (at the time of the delta connection), the control voltage Vd is divided by the voltage-dividing circuit including the resistors R623 and R624, a voltage VtΔ dependent on the voltage division ratio appears at the voltage division node.

The voltage VtΔ is given by:

$$VtΔ=Vd\times R624/(R623+R624) \qquad (7)$$

The voltage VtΔ is a threshold value (first threshold value) for the delta connection, and is supplied as the first reference value Vref1 to the inverted input terminal (minus terminal) of the comparator 622 at the time of the delta connection.

The resistance values of the resistors R623, R624, R633, R634 are so set that VtΔ and VtY mentioned above satisfy the above-mentioned equation (3), or VtΔ is smaller than √3 times VtY (but is larger than VtY).

When the digital transistor Q653 is on (at the time of the star connection), the resistor R624 is short-circuited by the digital transistor Q653, so that a potential close to the ground potential 0V, i.e., a potential Vq(=Von) which is higher than the ground potential 0V by a voltage drop Von between the collector and the emitter of the digital transistor Q653 in the on state appears at the voltage division node of the voltage-dividing circuit.

This potential Vq(=Von) is supplied, in place of the threshold value VtΔ, as the first reference value Vref1, to the inverted input terminal (minus terminal) of the comparator 622.

Supplied to the non-inverted input terminals (plus terminals) of the comparators 622 and 632 is the current value signal Sc from the current value detecting circuit 61.

The comparator 622 compares the current value signal Sc with the first reference value Vref1, and its output becomes High if the current value signal Sc is higher than the first reference value Vref1; otherwise its output becomes Low.

When the digital transistor Q653 is off (at the time of the delta connection), the first threshold value VtΔ is used as the first reference value Vref1. When the digital transistor Q653 is on (at the time of the star connection), Vq=Von is used as the first reference value Vref1.

The comparator 632 compares the current value signal Sc with the second reference value Vref2, and its output becomes High if the current value signal Sc is higher than the second reference value Vref2; otherwise its output becomes Low.

The digital transistor Q653 is not connected to the threshold value generating circuit 631 so that the comparator 632 uses the VtY as the second reference value Vref2 both at the time of the delta connection and at the time of the star connection.

The combining circuit 66 is formed of an AND circuit 683.

The output of the AND circuit 683 is High when the output terminals of the comparators 622 and 632 are both High. The output of the AND circuit 683 is Low, when at least one of the output terminals of the comparators 622 and 632 is Low.

The output Se of the AND circuit 683 is the output of the combining circuit 66, and hence the output of the over-current protection circuit 60b.

The output of the over-current protection circuit 60b is supplied to the over-current cut-off port Cin of the IPM 12 and the inverter output abnormality cut-off port POE of the microcomputer 52.

The operations of the decision circuits 62, 63, and the combining circuit 66 will now be described with reference to FIGS. 13(a) and 13(b).

As is mentioned above, the inverted connection selection signal Ss supplied to the base of the digital transistor Q653 is supplied from the connection switching control unit 521 of the control device 50.

This signal Ss is High as shown in FIG. 13(a) at the time of the star connection, and is Low as shown in FIG. 13(b) at the time of the delta connection.

Therefore, the digital transistor Q653 is on as shown in FIG. 13(a) at the time of the star connection, and is off as shown in FIG. 13(b) at the time of the delta connection.

Accordingly, supplied to the minus terminal of the comparator 622 as the first reference value Vref1 is VtΔ at the time of the delta connection (FIG. 13(b)), and Vq(=Von) at the time of the star connection (FIG. 13(a)).

Supplied to the minus terminal of the comparator 632 as the second reference value Vref2 is VtY both at the time of the star connection and at the time of the delta connection.

At the time of the delta connection, VtΔ is supplied as the first reference value Vref1 to the minus terminal of the comparator 622 (FIG. 13(b)), as described above. Also, there is a relation: VtY<VtΔ as described above.

Therefore, when the input current of the inverter 30 gradually increases, and accordingly the current value signal Sc gradually increases, the comparator 632 will find that the current value signal Sc has become larger than the reference value Vref2, and its output becomes High. Thereafter, the comparator 622 will find that the current value signal Sc has become larger than the reference value Vref1, and its output becomes High.

Then, at that time point, the output Se of the AND circuit 683 (over-current detection signal) becomes High.

In this way, at the time of the delta connection, the over-current detection signal Se becomes High at the time point when the current value signal Sc becomes larger than the threshold value VtΔ set for the delta connection.

At the time of the star connection, Vq(=Von) is supplied as the first reference value Vref1 to the minus terminal of the comparator 622 (FIG. 13(a)), as described above.

It is so configured that the current value signal Sc does not become equal to or smaller than Vq(=Von), so that the output of the comparator 622 is maintained High.

When the input current of the inverter 30 gradually increases, and accordingly the current value signal Sc gradually increases, the comparator 632 will find that the current value signal Sc has become larger than the reference value Vref2, and its output becomes High.

Then, at that time point, the output Se of the AND circuit 683 becomes High.

In this way, at the time of the star connection, the over-current detection signal Se becomes High at the time point when the current value signal Sc becomes larger than the threshold value VtY set for the star connection.

In the manner described above, at the time of the star connection, the comparison in the first decision circuit 62 using the threshold value VtΔ corresponding to the delta connection is nullified. It is therefore possible to perform over-current detection, both at the time of the star connection and at the time of the delta connection, based on the result of the comparison using the threshold value appropriate for each state (threshold value corresponding to the particular connection state).

Variation

In the fourth embodiment, the comparison in the first decision circuit 62 using the threshold value VtΔ is nullified, by having Vq(=Von) appear at the voltage division node in the threshold value generating circuit 621 in the first decision circuit 62. This however is not indispensable. What is essential is that a potential Vq which is lower than the threshold value threshold value VtY output from the threshold value generating circuit 631 in the second decision circuit 63 appears at the voltage division node of the threshold value generating circuit in the first decision circuit 62.

Figure 14:
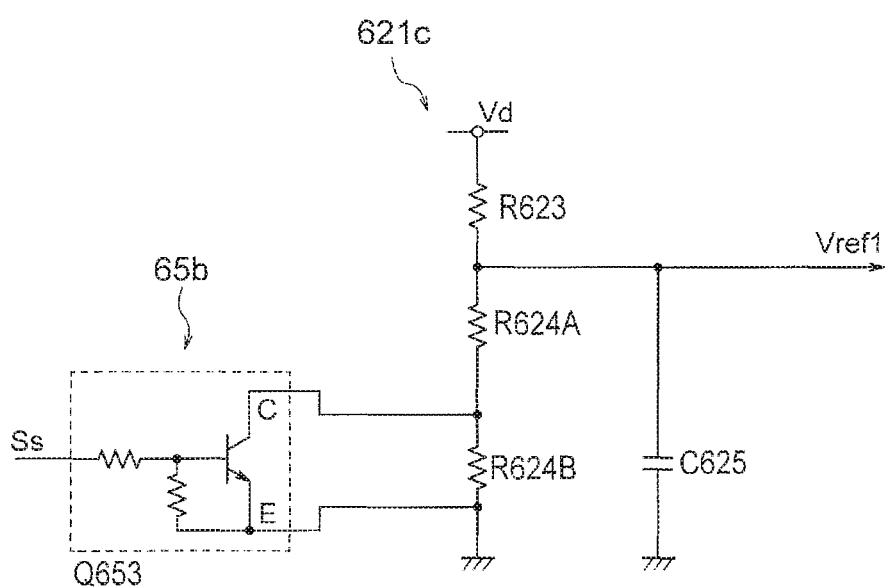
FIG. 14 is a wiring diagram showing an example of the threshold value generating circuit and the nullifying circuit in the first decision circuit used in a variation of the fourth embodiment.

For instance, the threshold value generating circuit 621 in the first decision circuit 62 may be replaced with a threshold value generating circuit 621c shown in FIG. 14, and a nullifying circuit 65b may be connected to the threshold value generating circuit 621c, as shown in FIG. 14.

The threshold value generating circuit 621c shown in FIG. 14 is similar to the threshold value generating circuit 621 shown in FIG. 12, but the resistor R624 is replaced with a series connection of resistors R624A and R624B, and accordingly, a voltage-dividing circuit is formed of the resistors R623, R624A, R624B connected in series with each other, and the digital transistor Q653 is provided to short-circuit the resistor R624B (resistor which is connected between the voltage division node and the ground).

For example, the resistance values R624A, R624B of the resistors R624A, R624B are so set as to satisfy the following relation with the resistance value R624 of the resistor R624 in the fourth embodiment:

$$R624A+R624B=R624 \quad (8)$$

In this case, the operation when the digital transistor Q653 is off (the operation at the time of the delta connection) is identical to that explained with reference to FIG. 13(b) in connection with the circuit shown in FIG. 12.

Figure 15:
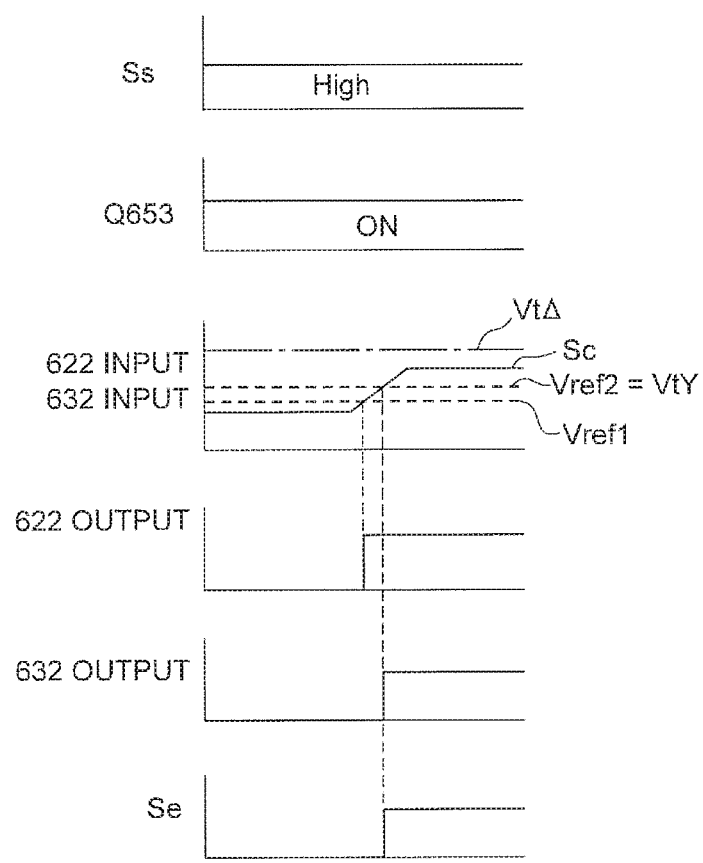
FIG. 15 is a time chart showing the operation of the over-current protection circuit provided with the threshold value generating circuit and the nullifying circuit in FIG. 14.

When the digital transistor Q653 is on (at the time of the star connection), a potential Vq given by:

$$Vq=\{(Vd-Von) \times R624A/(R623+R624A)\}+Von \quad (9)$$

appears, as shown in FIG. 15, at the voltage division node in the threshold value generating circuit 621c, and is supplied as the reference value Vref1 to the comparator 622.

Because Vq is smaller than VtY, at the time of the star connection, the comparator 632 will find that Sc has become larger than VtY after the comparator 622 finds that Sc has become larger than Vq. Accordingly, the over-current detection signal Se becomes High at the time point when Sc becomes larger than VtY. Thus, the over-current detection signal Se becomes High, at the time point when Sc becomes larger than VtY as is the case of the circuit shown in FIG. 12, described with reference to FIG. 13(*a*).

In designing, it is desirable that the constants of the elements be so set that Vq is sufficiently smaller than VtY taking account of the variations of the constants of the elements. That is, it is desirable that the resistance values of the resistors R623, R624A be so set that Vq given by the equation (9) is smaller than VtY minus a margin.

Fifth Embodiment

In the first to fourth embodiments, the connection switching means 40 is formed of selection switches. Alternatively, the connection switching means may be formed of combinations of a normally-closed switch and a normally-open switch. An example of such a configuration is shown in FIG. 16.

Figure 16:
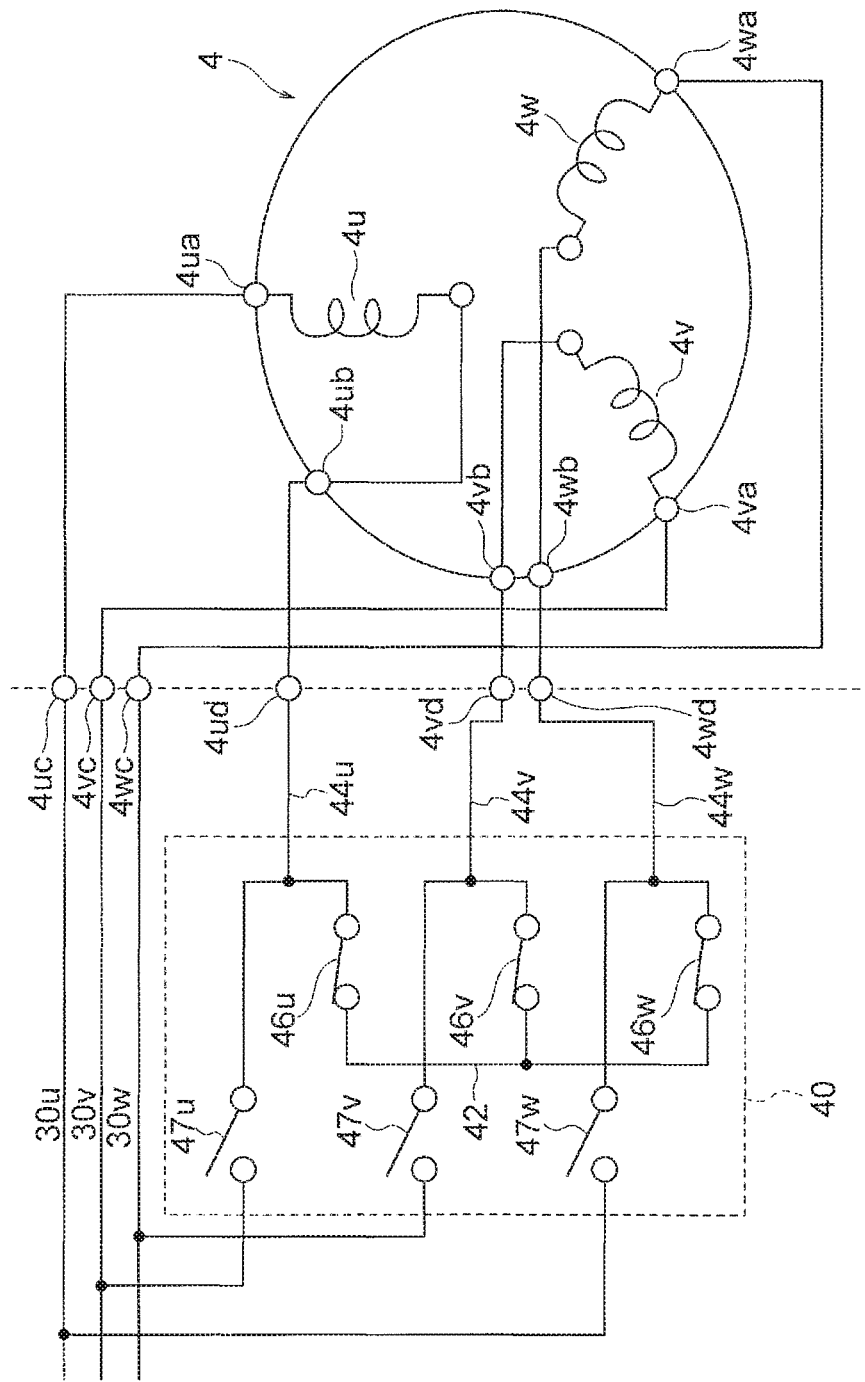
FIG. 16 is a wiring diagram showing the motor windings and the connection switching means in the fifth embodiment of the present invention.

In the configuration shown in FIG. 16, the selection switch 41*u* is replaced with a combination of a normally-closed switch 46*u* and a normally-open switch 47*u*, the selection switch 41*v* is replaced with a combination of a normally-closed switch 46*v* and a normally-open switch 47*v*, and the selection switch 41*w* is replaced with a combination of a normally-closed switch 46*w* and a normally-open switch 47*w*.

In the illustrated state in which the normally-closed switches 46*u*, 46*v*, 46*w* are closed (are on), and the normally-open switches 47*u*, 47*v*, 47*w* are open (are off), the motor is star-connected.

In a state opposite to the illustrated state, in which the normally-closed switches 46*u*, 46*v*, 46*w* are open, and the normally-open switches 47*u*, 47*v*, 47*w* are closed, the motor is delta-connected.

It is desirable that the switches used in the connection switching means 40 have a smaller on-time conduction loss, and mechanical switches such as relays and contactors are suitable.

However, when combinations of a normally-closed switch and a normally-open switch are used as shown in FIG. 16, a WBG semiconductor such as SiC or GaN may be used. They have low on-resistance and low loss, and their element heat generation is small. They can also perform high-speed switching. Accordingly, for switching the connection state while the motor is operated, it is desirable that the switches be formed of a semiconductor.

Where the motor is used to drive a compressor of an air-conditioner, and combinations of a normally-closed switch and a normally-open switch are used as shown in FIG. 16, it is desirable that the switches which are on when the connection state (e.g. the star connection state) assumed when the compressor load is low is selected, be normally-on-type semiconductor switches. This is because, by such an arrangement, the loss at the time of low load can be reduced, and the overall efficiency is high in the case of a motor used for driving a compressor of an air conditioner with which the proportion of the low-load operation in the entire operation time is high.

Sixth Embodiment

In the first to fifth embodiments, the present invention is applied to a motor having stator windings which can be switched between a star connection and a delta connection.

The present invention can be applied to cases in which the connection is switched in other ways.

For instance, the present invention can be applied to a motor in which the winding of each phase consists of two or more winding portions, and can be switched between a parallel connection and a series connection.

In this case, both ends of each of the two or more winding portions constituting the winding of each phase are made to be connectable to the outside of the motor, and the connection state is switched by a connection switching means.

Figure 17:
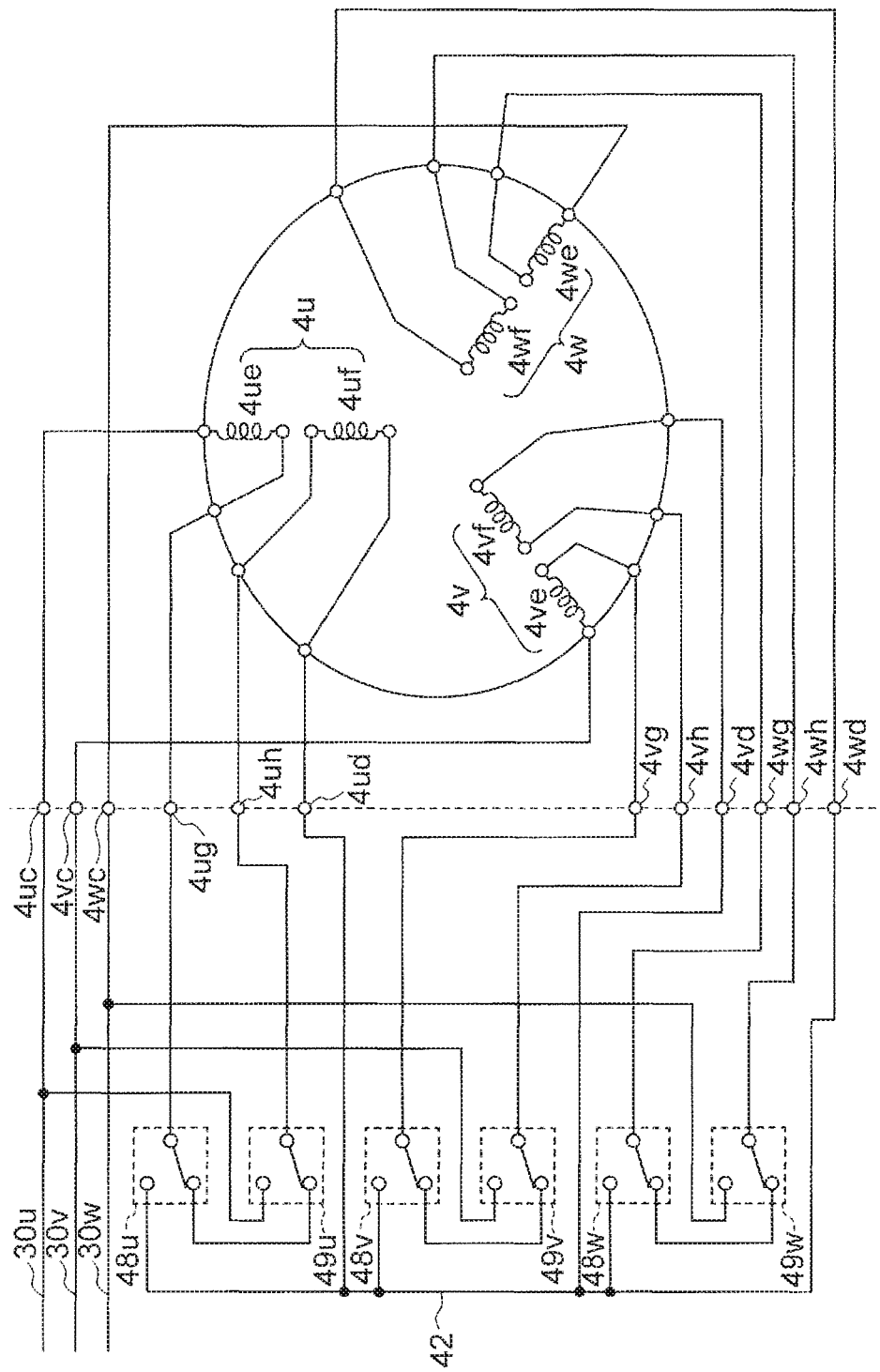
FIG. 17 is a wiring diagram showing the motor windings and the connection switching means in the sixth embodiment of the present invention.

FIG. 17 shows a configuration in which the winding of each phase of a star-connected motor consists of two winding portions, both ends of each winding portion are connectable to the outside of the motor, and the connection state is switched by a connection switching means.

Specifically, the U-phase winding 4*u* consists of two winding portions 4*ue*, 4*uf*, the V-phase winding 4*v* consists of two winding portions 4*ve*, 4*vf*, and the W-phase winding 4*w* consists of two winding portions 4*we*, 4*wf*.

First ends of the winding portions 4*ue*, 4*ve*, 0we are connected via external terminals 4*uc*, 4*vc*, 4*wc* to the output lines 30*u*, 30*v*, 30*w* of the inverter 30.

Second ends of the winding portions 4*ue*, 4*ve*, 0we are connected via external terminals 4*ug*, 4*vg*, 4*wg* to common contacts of selection switches 48*u*, 48*v*, 48*w*.

First ends of the winding portions 4*uf*, 4*vf*, 4*wf* are connected via external terminals 4*uh*, 4*vh*, 4*wh* to common contacts of the selection switches 49*u*, 49*v*, 49*w*.

Second ends of the winding portions 4*uf*, 4*vf*, 4*wf* are connected via external terminals 4*ud*, 4*vd*, 4*wd* to a neutral point node 42.

Normally-closed contacts of the selection switches 48*u*, 48*v*, 48*w* are connected to normally-closed contacts the selection switches 49*u*, 49*v*, 49*w*.

Normally-open contacts of the selection switches 48*u*, 48*v*, 48*w* are connected to the neutral point node 42.

Normally-open contacts of the selection switches 49*u*, 49*v*, 49*w* are connected to the output lines 30*u*, 30*v*, 30*w* of the inverter 30.

The selection switches 48*u*, 48*v*, 48*w*, 49*u*, 49*v*, 49*w* in combination form the connection switching means 40.

In such a configuration, an over-current protection circuit similar to those shown in the first to fifth embodiments can be used. However, in deciding the threshold values of the decision circuits 62, 63, the following points should be taken into account.

In the configuration shown in FIG. 17, in a state in which the selection switches 48*u*, 48*v*, 48*w*, 49*u*, 49*v*, 49*w* are switched to the normally-closed contact side as illustrated, the motor is in a series connection state, and in a state in which the selection switches 48*u*, 48*v*, 48*w*, 49*u*, 49*v*, 49*w* are switched to the normally-open contact side, opposite to that illustrated, the motor is in a parallel connection state. The ratio between the current flowing through the motor winding and the inverter current differ between the series connection state and the parallel connection state. That is, in the series connection state, the current flowing through the motor winding and the output current of the inverter 30 are equal, whereas in the parallel connection state, the output current of the inverter 30 is twice the current flowing through the motor winding.

Accordingly, when the inverter is controlled so as to prevent the detected value of the inverter current from exceeding a certain threshold value for preventing demagnetization, the threshold value for the parallel connection needs to be twice the threshold value for the series connection. That is, if decision circuits are provided for the respective connection states, the threshold value used in the decision circuit for the parallel connection is set to be twice the threshold value used in the decision circuit for the series connection.

Also in the sixth embodiment, combinations of a normally-closed switch and a normally-open switch may be used in place of the selection switches, as is described in the fifth embodiment.

Description has been made of a case in which a star-connected motor is switched between a series connection state and a parallel connection state. The present invention is equally applicable to a case in which a delta-connected motor is switched between a series connection state and a parallel connection state.

Variations

In the first to sixth embodiments described above, the input current of the inverter 30 is detected.

Alternatively, the output current of the inverter 30 may be detected. In such a case, a current detection element, for example, a current transformer, may be provided for just one phase, and the over-current detection may be made based on the current of the single phase. Alternatively, a current detection element, for example, a current transformer may be provided for each of the three phases, and the over-current detection may be made based on an average of the currents of the three phases, or a maximum value at each instance of the currents of the three phases. Furthermore, a current detection element, for example, a current transformer may be provided for each of two phases, and the over-current detection may be made based on an average of the currents of the two phases, or a maximum value at each instance of the currents of the two phases.

In the first to sixth embodiments described above, the motor can assume any of two connection states, and two decision circuits are provided to make determinations using two threshold values respectively corresponding to the two connection states, and the comparison using the threshold value other than the threshold value corresponding to the connection state is nullified when required.

The present invention is also applicable where the motor can assume three or more connection states. That is, to generalize, the present invention is applicable where the motor can select any of a plurality of (n) connection states.

In such a case, as the over-current protection circuit, one having a plurality of decision circuits provided for the plurality of connection states respectively, a combining circuit for combining the results of the comparisons in the plurality of decision circuits, and a nullifying circuit for nullifying part of the comparisons made by the plurality of decision circuits may be used.

In this case, as the over-current protection circuit, one detecting the input current or the output current of the inverter, and stopping the inverter when the detected current becomes excessive may be used.

Moreover, as the plurality of decision circuits, those provided for the plurality of connection states respectively, and using the threshold values respectively corresponding to the plurality of connection states as the reference values for the comparison of the detected current may be used.

Also, as the nullifying circuit, one which, when required, nullifies the comparison using the threshold value other than the threshold value corresponding to the selected connection state, among the comparisons in the plurality of decision circuits, and causing, by means of the nullification, the output of the combining circuit to be identical with the output of the decision circuit corresponding to the selected connection state is used.

When the number of the connection states is generalized from two to plurality (n), in the configurations of the first to third embodiments (FIG. 1 to FIG. 10), as the combining circuit, one having an OR circuit taking a logical sum of the outputs of the plurality of decision circuits may be used; and as the nullifying circuit, one causing performance of the comparison using, as the reference value, a value larger than the threshold value corresponding to the selected connection state, in place of the threshold value smaller than the threshold value corresponding to the selected connection state may be used.

In such a case, for example, each of the plurality of decision circuits may have a threshold value generating circuit including a voltage-dividing circuit for dividing the voltage of the control power source, and outputting, as the threshold value, the voltage appearing, as a result of the division, at the voltage division node of the voltage-dividing circuit, and a comparator using the threshold value output from the threshold value generating circuit as the reference value, for determining whether the detected current is larger than the reference value, the voltage-dividing circuit may include a plurality of resistors connected in series between the control power source and the ground, and the nullifying circuit may short-circuit one of the plurality of resistors which are connected in series, for causing a value larger than the threshold value corresponding to the selected connection state, to be output from the voltage division node, in place of the above-mentioned threshold value.

The resistor which is short-circuited is, for example, one connected between the voltage division node and the control power source.

When the number of the connection states is generalized from two to plurality (n), in the configuration of the fourth embodiment (FIG. 11 to FIG. 15), as the combining circuit, one having an AND circuit taking a logical product of the outputs of the plurality of decision circuits may be used;

as the nullifying circuit, one causing performance of the comparison using, as the reference value, a value smaller than the threshold value corresponding to the selected connection state, in place of the threshold values larger than the threshold value corresponding to the selected connection state may be used.

In such a case, for example, each of the plurality of decision circuits may have a threshold value generating circuit including a voltage-dividing circuit for dividing the voltage of the control power source, and outputting, as the threshold value, the voltage appearing, as a result of the division, at the voltage division node of the voltage-dividing circuit, and a comparator using the threshold value output from the threshold value generating circuit as the reference value, for determining whether the detected current is larger than the reference value, the voltage-dividing circuit includes a plurality of resistors connected in series between the control power source and the ground, and the nullifying circuit may short-circuit one of the plurality of resistors which are connected in series, for causing a value smaller than the threshold value corresponding to the selected connection state, to be output from the voltage division node, in place of the above-mentioned threshold value.

The resistor which is short-circuited is, for example, one connected between the voltage division node and the ground.

The invention claimed is:

1. A motor driving apparatus comprising:
a connection switching means for selecting one of a plurality of connection states of a motor which is capable of operation in one of the plurality of connection states;
an inverter for supplying said motor with AC power, to cause said motor to operate;
a control device for causing said connection switching means to make selection of the connection state, and controlling said inverter; and
an over-current protection circuit for protecting said inverter; wherein said over-current protection circuit comprises:
a plurality of decision circuits respectively provided for said plurality of connection states;
a combining circuit for combining results of comparisons in said plurality of decision circuits; and
a nullifying circuit for nullifying part of the comparisons in said plurality of decision circuits, wherein
said over-current protection circuit detects an input current or an output current of said inverter, and causes said inverter to stop when the detected current becomes excessive;
said plurality of decision circuits perform comparisons of the detected current using, as reference values, threshold values respectively corresponding to said plurality of connection states;
said nullifying circuit nullifies, when required, among the comparisons in said plurality of decision circuits, the comparison using the threshold value other than the threshold value corresponding to the selected connection state, and causes, by the nullification, an output of said combining circuit to be identical to an output of the decision circuit corresponding to the selected connection state, among said plurality of decision circuits, wherein
said combining circuit comprises an OR circuit which takes a logical sum of outputs of said plurality of decision circuits; and
said nullifying circuit causes performance of comparison using, as said reference value, a value larger than the threshold value corresponding to the selected connection state, in place of the threshold value smaller than the threshold value corresponding to the selected connection state.

2. The motor driving apparatus as set forth in claim 1, wherein
each of said plurality of decision circuits comprises:
a threshold value generating circuit having a voltage-dividing circuit for dividing the voltage of a control power source, and outputting a voltage appearing, as a result of the division, at a voltage division node of said voltage-dividing circuit, as said threshold value; and
a comparator for using said threshold value output from said threshold value generating circuit as a reference value, and determining whether the detected current is larger than said reference value;
said voltage-dividing circuit comprises a plurality of resistors connected in series between said control power source and a ground; and
said nullifying circuit short-circuits one of the plurality of resistors connected in series, for causing a value larger than the threshold value corresponding to the selected connection state, to be output from said voltage division node, in place of said threshold value.

3. The motor driving apparatus as set forth in claim 2, wherein
the resistor which is short-circuited is a resistor connected between said voltage division node and said control power source.

4. The motor driving apparatus as set forth in claim 2, wherein said nullifying circuit has a transistor which short-circuits said resistor.

5. The motor driving apparatus as set forth in claim 4, wherein said transistor is a digital transistor.

6. The motor driving apparatus as set forth in claim 1, wherein
said inverter supplies said motor with AC power of a variable frequency for causing said motor to operate at a variable speed; and
said control device controls said connection switching means for causing the selection of the connection state, and performs on-off control over said inverter to cause the supply of said AC power to said motor.

7. The motor driving apparatus as set forth in claim 1, wherein
said plurality of connection states include a first connection state and a second connection state,
said first connection state is a star connection state, and said second connection state is a delta connection state.

8. The motor driving apparatus as set forth in claim 7, wherein the threshold value corresponding to said delta connection state is equal to or less than $\sqrt{3}$ times the threshold value corresponding to said star connection state.

9. The motor driving apparatus as set forth in claim 1, wherein switching elements of said connection switching means are formed of semiconductor elements.

10. The motor driving apparatus as set forth in claim 9, wherein WBG semiconductor elements are used as said semiconductor elements.

11. The motor driving apparatus as set forth in claim 1, further comprising an inverter driving circuit for supplying said inverter with drive signals;
wherein
said inverter and said inverter driving circuit are formed of an IPM;
an output of said combining circuit is input to an over-current cut-off port of said IPM;
said inverter driving circuit stops said inverter responsive to the output of said combining circuit input to said over-current cut-off port.

12. The motor driving apparatus as set forth in claim 11, wherein
said control device has a microcomputer which outputs on-off control signals for on-off control over said inverter, and supplies the on-off control signals to said inverter driving circuit;
the output of said combining circuit is supplied to said microcomputer; and
said microcomputer stops output of said on-off control signals responsive to the output of said combining circuit.

13. A motor driving apparatus comprising:
a connection switching means for selecting one of a plurality of connection states of a motor which is capable of operation in one of the plurality of connection states;

an inverter for supplying said motor with AC power, to cause said motor to operate;

a control device for causing said connection switching means to make selection of the connection state, and controlling said inverter; and an over-current protection circuit for protecting said inverter; wherein said over-current protection circuit comprises:

a plurality of decision circuits respectively provided for said plurality of connection states;

a combining circuit for combining results of comparisons in said plurality decision circuits; and a nullifying circuit for nullifying part of the comparisons in said plurality of decision circuits, wherein said over-current protection circuit detects an input current or an output current of said inverter, and causes said inverter to stop when the detected current becomes excessive;

said plurality of decision circuits perform comparisons of the detected current using, as reference values, threshold values respectively corresponding to said plurality of connection states;

said nullifying circuit nullifies, when required, among the comparisons in said plurality of decision circuits, the comparison using the threshold value other than the threshold value corresponding to the selected connection state, and causes, by the nullification, an output of said combining circuit to be identical to an output of the decision circuit corresponding to the selected connection state, among said plurality of decision circuits, wherein said combining circuit comprises an AND circuit which takes a logical product of outputs of said plurality of decision circuits;

said nullifying circuit causes performance of comparison using, as said reference value, a value smaller than the threshold value corresponding to the selected connection state, in place of the threshold value larger than the threshold value corresponding to the selected connection state.

14. The motor driving apparatus as set forth in claim 13, wherein each of said plurality of decision circuits comprises:

a threshold value generating circuit having a voltage-dividing circuit for dividing the voltage of a control power source and outputting a voltage appearing, as a result of the division, at a voltage division node of said voltage-dividing circuit, as said threshold value; and a comparator for using said threshold value output from said threshold value generating circuit as a reference value, and determining whether the detected current is larger than the reference value;

said voltage-dividing circuit comprises a plurality of resistors connected in series between said control power source and a ground; and said nullifying circuit short-circuits one of the plurality of resistors connected in series, for causing a value smaller than the threshold value corresponding to the selected connection state, to be output from said voltage division node, in place of said threshold value.

15. The motor driving apparatus as set forth in claim 14, wherein the resistor that is short-circuited is a resistor connected between said voltage division node and said ground.

16. The motor driving apparatus as set forth in claim 14, wherein said inverter supplies said motor with AC power of a variable frequency for causing said motor to operate at a variable speed; and said control device controls said connection switching means for causing the selection of the connection state, and performs on-off control over said inverter to cause the supply of said AC power to said motor.

17. The motor driving apparatus as set forth in claim 14, wherein said nullifying circuit has a transistor which short-circuits said resistor.

18. The motor driving apparatus as set forth in claim 17, wherein said transistor is a digital transistor.

19. The motor driving apparatus as set forth in claim 13, wherein said plurality of connection states include a first connection state and a second connection state, said first connection state is a star connection state, and said second connection state is a delta connection state.

20. The motor driving apparatus as set forth in claim 19, wherein the threshold value corresponding to said delta connection state is equal to or less than $\sqrt{3}$ times the threshold value corresponding to said star connection state.

21. The motor driving apparatus as set forth in claim 13, wherein switching elements of said connection switching means are formed of semiconductor elements.

22. The motor driving apparatus as set forth in claim 21, wherein WBG semiconductor elements are used as said semiconductor elements.

23. The motor driving apparatus as set forth in claim 13, further comprising an inverter driving circuit for supplying said inverter with drive signals;

wherein said inverter and said inverter driving circuit are formed of an IPM;

an output of said combining circuit is input to an over-current cut-off port of said IPM;

said inverter driving circuit stops said inverter responsive to the output of said combining circuit input to said over-current cut-off port.

24. The motor driving apparatus as set forth in claim 23, wherein said control device has a microcomputer which outputs on-off control signals for on-off control over said inverter, and supplies the on-off control signals to said inverter driving circuit;

the output of said combining circuit is supplied to said microcomputer; and said microcomputer stops output of said on-off control signals responsive to the output of said combining circuit.

* * * * *